(12) United States Patent
Hegg et al.

(10) Patent No.: US 10,547,586 B1
(45) Date of Patent: Jan. 28, 2020

(54) BIDDING ON ELECTRONIC RESOURCES

(71) Applicant: Amazon Technologies, Inc., Seattle, WA (US)

(72) Inventors: Joel C. Hegg, Seattle, WA (US); Peter C. Beckman, Falls Church, VA (US); Jeremy T. Hall, Sterling, VA (US)

(73) Assignee: Amazon Technologies, Inc., Reno, NV (US)

( * ) Notice: Subject to any disclaimer, the term of this patent is extended or adjusted under 35 U.S.C. 154(b) by 867 days.

(21) Appl. No.: 15/148,812

(22) Filed: May 6, 2016

Related U.S. Application Data

(62) Division of application No. 13/248,233, filed on Sep. 29, 2011, now Pat. No. 9,336,551.

(51) Int. Cl.
| | |
|---|---|
| *G06Q 30/00* | (2012.01) |
| *H04L 29/12* | (2006.01) |
| *G06Q 30/08* | (2012.01) |
| *G06Q 30/06* | (2012.01) |

(52) U.S. Cl.
CPC ......... *H04L 61/2007* (2013.01); *G06Q 30/08* (2013.01); *G06Q 30/06* (2013.01)

(58) Field of Classification Search
CPC ..... H04L 61/2007; G06Q 30/08; G06Q 30/06
USPC .................................................... 705/26, 27
See application file for complete search history.

(56) References Cited

U.S. PATENT DOCUMENTS

| | | | |
|---|---|---|---|
| 6,597,661 B1 | 7/2003 | Bonn | |
| 6,826,616 B2 * | 11/2004 | Larson | H04L 29/12301 709/228 |
| 7,421,499 B1 | 9/2008 | Lanahan et al. | |
| 2002/0091827 A1 | 7/2002 | King et al. | |
| 2002/0143787 A1 * | 10/2002 | Knee | G06F 7/02 |
| 2002/0162027 A1 | 10/2002 | Itwaru et al. | |
| 2004/0010592 A1 | 1/2004 | Carver et al. | |
| 2004/0103205 A1 * | 5/2004 | Larson | H04L 29/12301 709/229 |
| 2006/0200659 A1 * | 9/2006 | Gillum | H04L 63/083 713/151 |
| 2008/0294780 A1 * | 11/2008 | Lanahan | H04L 29/06 709/226 |
| 2009/0210417 A1 * | 8/2009 | Bennett | G06F 16/951 |
| 2010/0153537 A1 * | 6/2010 | Wang | H04L 63/14 709/224 |
| 2010/0205304 A1 * | 8/2010 | Chaturvedi | H04L 61/2015 709/226 |

OTHER PUBLICATIONS

Unknown, "Amazon Web Service: Internet Archive Wayback Machine", www.archive.org, Aug. 2010-Sep. 23, 2010, 18 pages.

(Continued)

*Primary Examiner* — Robert M Pond
(74) *Attorney, Agent, or Firm* — Kilpatrick Townsend & Stockton LLP

(57) ABSTRACT

Systems and methods involve managing exhaustible electronic resources, such as IPv4 addresses. A determination to allocate an internet protocol (IP) address can be made based at least in part on an amount of traffic that the IP address receives when not allocated to a customer and another amount of traffic received from a prospective customer. Information directed to the allocated IP address can be received and routed to a network associated with the customer via a connection configured to share information using the IP address.

16 Claims, 10 Drawing Sheets

(56) References Cited

OTHER PUBLICATIONS

U.S. Appl. No. 13/248,233, "Final Office Action", dated Nov. 20, 2015, 11 pages.
U.S. Appl. No. 13/248,233, "Non-Final Office Action", dated May 20, 2015, 30 pages.
U.S. Appl. No. 13/248,233, "Notice of Allowance", dated Jan. 22, 2016, 13 pages.
Dell, "Two economic perspectives on the IPv6 transition", The Journal of Policy, Regulation and Strategy for Telecommunications, Information and Media, vol. 12, Issue. 4, ProQuest Dialog #578110857, 2010, pp. 3-14.
Unknown, "Amazon Virtual Private Cloud: Network Administrator Guide", Amazon Web Services, API Version Jul. 15, 2011, Jul. 15, 2011, 80 pages.

\* cited by examiner

BIDDING ON ELECTRONIC RESOURCES

CROSS-REFERENCE TO RELATED APPLICATIONS

This application is a Division of U.S. patent application Ser. No. 13/248,233, filed Sep. 29, 2011, entitled "Bidding on Electronic Resources," and issued to U.S. Pat. No. 9,336,551 on May 10, 2016, the content of which is hereby incorporated by reference in its entirety.

BACKGROUND

As the number of devices associated with one or more unique identifiers, such as Internet Protocol (IP) addresses, that communicate with other devices in a network increases, the demand for unique identifiers increases as well. The maximum number of unique identifiers for one or more networks, however, may be limited for various reasons. Thus, the maximum number of unique identifiers may not change even as demand for the unique identifiers increases. In addition, at least a portion of the maximum number of unique identifiers may be unavailable because another party owns or has the right to use the portion of unique identifiers. In some cases, a party may own or have the right to use more unique identifiers than are currently needed.

For example, there are a predetermined number of Internet Protocol version 4 (IPv4) addresses. As the number of Internet users and the number of devices that need to be associated with one or more IPv4 addresses has increased, the number of available IPv4 addresses has decreased. Furthermore, as the number of unallocated IPv4 addresses has decreased, the demand for unallocated IPv4 addresses has increased.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
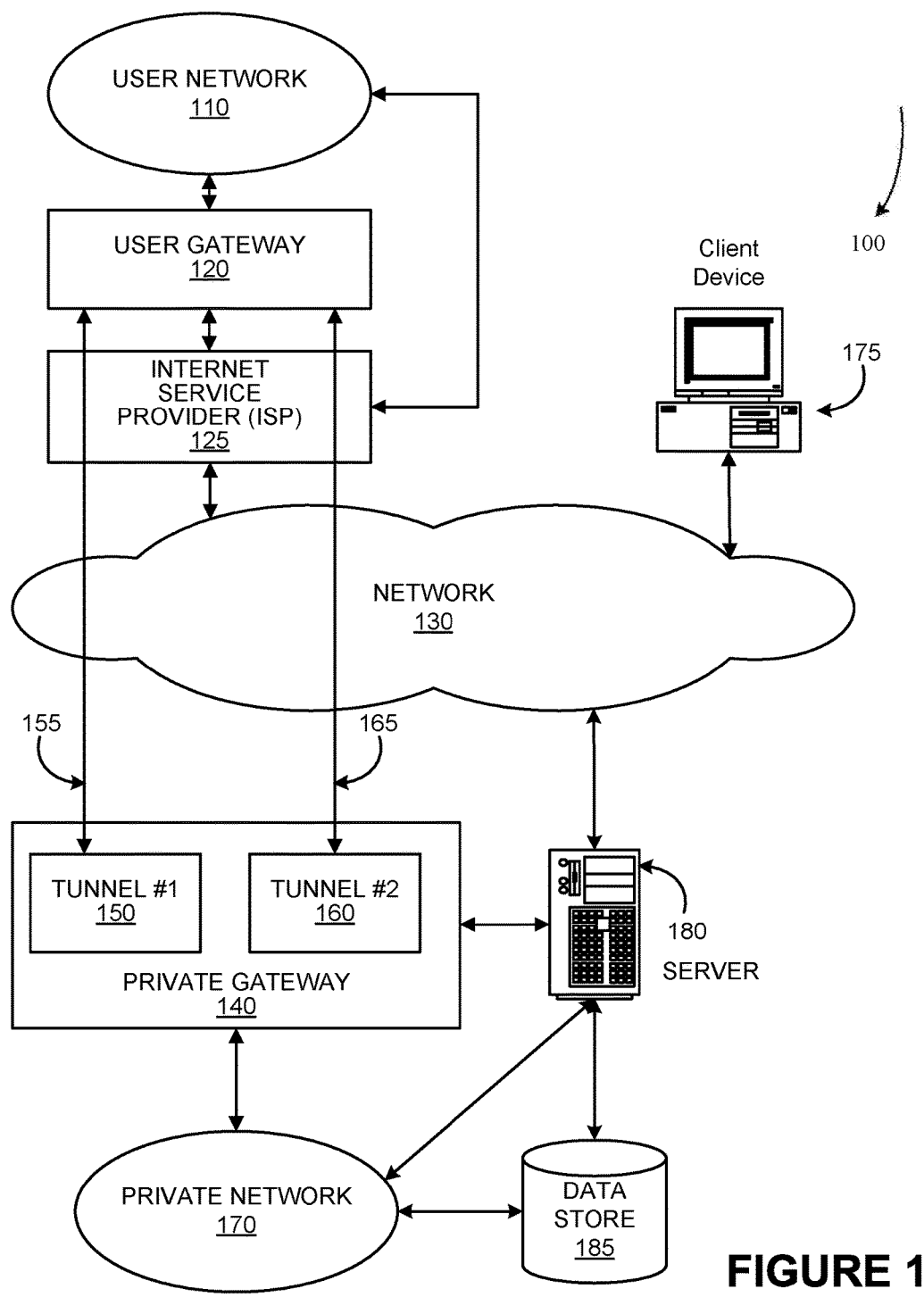
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Systems and methods that efficiently facilitate transactions of exhaustible electronic resources are described herein. Embodiments of the present disclosure include systems and methods of managing a spot market for unique identifiers. In a particular illustrative embodiment, an organization manages units of an electronic resource. The electronic resource may be exhaustible, thereby preventing the creation of additional units of the resource. In an embodiment, the electronic resource is an exhaustible shared electronic public resource, a portion of which is under the control of the organization. Internet Protocol version 4 (IPv4) addresses, Internet Protocol version 6 (IPv6) addresses, ten digit telephone numbers, and other address identifiers, which may be unique identifiers, are examples of exhaustible shared electronic public resources.

In an embodiment, an organization utilizes a market to allocate units of the exhaustible electronic public resource to other organizations. For example, the organization may allocate a unit of the exhaustible electronic public resource based at least in part on pricing criteria, such as maximum prices and/or other criteria, received from bidders. The organization may assign an arbitrary initial price for units of the resource and may manage units of the resource based on the initial price and the received pricing criteria. For example, if the pricing criteria received from a bidder is greater than the initial price for the units, then one or more units of the resource may be allocated to the bidder. The organization can use the received pricing criteria to calculate a spot price for the units of the resource and may manage units of the resource such that bidders whose pricing criteria are satisfied by the spot price are allocated units of the resource. For example, the organization may determine the spot price as the maximum price that will result in a maximum number of a supply of units of the resource being leased. Bidders to whom leases are granted may then pay the determined spot price or another price, such as their maximum bid price, for a number of units of the resource.

When a bidder's pricing criteria is satisfied by the spot price, the bidder (or an organization associated with the bidder) may be allocated a number of units (or other such measure) of the resource. Allocating the units may be performed in various ways, depending on the type of resource. In an embodiment where the units of the resources are IP addresses, allocating the units may include updating one or more records on a WHOIS server. For example, in one embodiment records are updated on a WHOIS server associated with an organization managing the allocation of units of the exhaustible electronic resource. In another embodiment, records may be updated on a WHOIS server associated with an organization that owns units of the exhaustible electronic resource. Updated records on the WHOIS server may indicate that the bidder has been allocated a number of the units of the resource. Allocating units of the resource may include utilizing a connection, such as a virtual private network (VPN) connection, between a network associated with an organization managing units of the resource and a network associated with a bidder. Border Gateway Protocol (BGP) may be used to cause routers to re-route traffic to the IP addresses and, in particular, to re-route network traffic according to instructions from the bidder. As an example, the organization or an internet service provider (ISP) may advertise BGP routes for the IP addresses that cause network traffic to the IP addresses to be routed to network destinations specified by the bidder or the organization. Other actions may also be taken to avoid problems that may arise when IP addresses are allocated. For example, allocation information may be published to enable various services that track IP addresses to receive updates. As a specific example, a service that identifies the location of an IP address may receive published information to continue providing the service accurately.

In an embodiment, units of the resource are managed by the organization by allocating units of the resource in a manner that is revocable. In this manner, as the spot price changes over time, bidders may maintain control over units of the resource as long as their pricing criteria are satisfied by the spot price. For example, if the spot price exceeds a maximum bid price of a bidder, units allocated to the bidder may be revoked. For instance, with IP addresses, if a lessee's maximum bid price is exceeded by the spot price, then one or more IP addresses may be deallocated from the lessee. As another example, a connection, such as a VPN connection, may be shut down or otherwise disconnected so that the bidder no longer has access to units of the exhaustible resource. In one embodiment, records on a WHOIS server are updated to reflect that units of the exhaustible resource are no longer allocated to the bidder. Control of the revoked IP addresses (or other resource units) may be provided to another bidder. In addition, revoked IP addresses (or other resource units) may be left unallocated for a period of time to allow for a smooth transition to a new lessee, for instance, to avoid network traffic intended for a former lessee from being sent to a new lessee, thereby taxing resources of the new lessee.

Variations are considered as being within the scope of the present disclosure. In an embodiment, spot market prices may be determined for indefinite time periods. For example, in an embodiment, a bidder retains control over a set of IP addresses (or other units of resource) while the bidder's pricing criteria is satisfied by the spot price. The bidder may lose control over the set of IP addresses if the spot price changes so as to not satisfy the pricing criteria, if the bidder withdraws a bid, or if the bidder changes the pricing criteria specifically to not be satisfied by the spot price. In this manner, the bidder may retain control for a time period that is not pre-determined, but that is subject to spot price changes and/or actions by the bidder. The bidder may pay per time period for control of the IP addresses, although the price may change with the spot price. For example, the price paid may be the spot price. Spot prices may also be determined for different aspects of the same resource. As an example, spot market prices may be determined for IP addresses for different lease terms. Thus, the spot market price for an IP address for one month may be different than the spot market price for an IP address for a year. When a lease term nears an end, the lessee may, in some embodiments, renew a lease by paying the current spot price for the same or a different lease term. As another example where spot prices may be determined for various aspects of a resource, spot prices may be determined for contiguous blocks of IP space and/or for different size blocks of IP space. For example, classless inter-domain routing (CIDR) /24 contiguous blocks may have one spot price, while /22 blocks may have another spot price. Non-contiguous blocks of the same size may have their own spot price and the spot prices may be for various time periods or for indefinite time periods.

As another example of a variation considered as being within the scope of the present disclosure, an organization may operate a spot market where units of a resource are provided from various owners. For example, owners of IP addresses may utilize a spot market operated by an organization. Bidders may purchase IP address leases on the spot market and the owners may, in response to transactions, cause IP address routing to be changed accordingly. The operator of the spot market may also bid on IP addresses in the market of its own use, such as to manage computing resources as a service to others. Other variations are also considered as being within the scope of the present disclosure, including additional variations discussed below.

FIG. 1 illustrates a system diagram depicting exemplary devices in an exemplary computing environment according to various embodiments. The system 100 shown in FIG. 1 includes a user network 110, a user gateway 120, a private gateway 140, and a private network 170. In this embodiment, the user gateway 120 is connected with the user network 110 and the private gateway 140 is connected with the private network 170. The user gateway 120 and the private gateway 140 can communicate with each other through the network 130. The connection between the user gateway 120 and the private gateway 140 may be a VPN connection. In the embodiment shown in FIG. 1, the VPN connection has two tunnel connections 155, 165. The first tunnel connection 155 connects the user gateway 120 with the private gateway 140 through tunnel 150. The second tunnel connection 165 connects the user gateway 120 with the private gateway 140 through the tunnel 160. Each tunnel connection 155, 165 can independently be used to communicate with the user gateway 120 and the private gateway 140. If tunnel connection 155 fails, the user gateway 120 may still be able to communicate with the private gateway 140, and vice versa, through tunnel connection 165. Thus, the user network 110 can communicate with the private network 170 through the user gateway 120, network 130, and the private gateway 140.

In embodiments, the user network 110 shown in FIG. 1 facilitates communications between various devices connected with the user network 110 and the private network 170. The user network 110 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the user network 110 may be a single network. In other embodiments, the user network 110 may comprise two or more networks.

In embodiments, the user gateway 120 can include any device or devices that is capable of facilitating communications between two or more networks or devices. For example, in FIG. 1, the user gateway 120 may be able to facilitate communications between the user network 110 and the private network 170 through the network 130 and the private gateway 140. In one embodiment, one or more routers may be used to facilitate communications between the two or more networks or devices. In another embodiment, the user gateway 120 may be an application capable of facilitating communications between two or more networks or devices. For example, in FIG. 1, the user gateway 120 may be an application executing on a server that facilitates communications between the user network 110 and the private network 170 through the network 130 and the private gateway 140.

One or more connections to the user network 110 may be provided through an Internet Service Provider (ISP) 125. An ISP 125 can be any organization that provides a customer with access to the internet. For example, in FIG. 1, a device such as a laptop or desktop in communication with the user network 110 may be able to access the internet through the ISP 125. An ISP may connect customers to the internet using various types of connections or technologies including, but not limited to, copper wires, dial-up, digital subscriber line (DSL), asymmetric digital subscriber line (ASDL), wireless technologies, fiber optics, or integrated services digital network (ISDN). An ISP may have an autonomous system number (ASN). In embodiments, the ISP can announce routes that cause changes to Internet routing. For example, the ISP 125 may announce BGP routes for IP addresses. In one embodiment, the ISP 125 may announce a block of IP addresses allocated to a bidder by an organization so that traffic to the block of IP addresses is routed to one or more locations specified by the bidder. In another embodiment, the ISP 125 may announce routing information for one or more IP addresses specified by an organization allocating the one or more IP addresses. In embodiments, an ISP 125 may be associated with various devices such as gateways, routers, switches, repeaters, or other devices.

Referring back to FIG. 1, in embodiments, the network 130 shown in FIG. 1 facilitates communications between the user network 110 and the private network 170. The network 130 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the network 130 may be a single network. In other embodiments, the network 130 may comprise two or more networks. In an embodiment, the network 130 may be a network that is managed by one or more entities. For example, the network 130 may be managed by a computing resource provider such as a cloud computing provider.

In embodiments, the private gateway 140 can include any device or set of devices capable of facilitating communications between two or more networks or devices. For example, in FIG. 1, the private gateway 140 may be able to facilitate communications between the user network 110 and the private network 170 through the network 130 and the user gateway 120. In one embodiment, one or more routers may be used to facilitate communications between the two or more networks or devices. In another embodiment, the private gateway 140 may be an application capable of facilitating communications between two or more networks or devices. For example, in FIG. 1, the private gateway 140 may be an application executing on one or more servers that facilitates communications between the user network 110 and the private network 170 through the network 130 and the user gateway 120.

The private gateway 140 or the user gateway 120, or both, may support multiple tunnels for a single connection. For example, in FIG. 1, a VPN connection may comprise a first tunnel connection 155 and a second tunnel connection 165. Each tunnel connection 155, 165 may be able to independently facilitate communications between the user gateway 120 and the private gateway 140 through the network 130. Redundant tunnel connections in single connection may be useful for providing communications between networks or devices when one or more tunnels become unavailable. For example, in FIG. 1, if tunnel connection 155 fails, then the user gateway 120 may still be able to communicate with the private network 170 through the second tunnel 160 in the private gateway 140 and through the network 130.

In embodiments, the private network 170 shown in FIG. 1 facilitates communications between various devices connected with the private network 170 and the user network 110. The private network 170 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the private network 170 may be a single network. In other embodiments, the private network 170 may comprise two or more networks. In an embodiment, the private network 170 may be a network that is managed by one or more entities. For example, the private network 170 may be managed by a computing resource provider such as a cloud computing provider.

In FIG. 1, a client device 175 is connected with the network 130. In embodiments, a client device 175 may be any device capable of communicating with a network, such as network 130, and capable of sending and receiving information to and from another device. For example, in FIG. 1, the client device 175 is a desktop computer. In other embodiments, the client device 175 may be a tablet computer, a mobile phone, or a laptop. The client device 175 may be in communication with a display and be able to connect to the network 130 through a wired or wireless network connection. The client device 175 may be in communication with any number of input devices such as a keyboard or a mouse. In one embodiment, the client device 175 may send a request to an IP address allocated to an entity associated with the user network 110. In this embodiment, the request may be routed through network 130 to the server 180. The server 180, in turn, may route the request through the private gateway 140 and user gateway 120 to user network 110. The user network 110 may send a response to the request. For example, user network 110 may send a response to the request through user gateway 120, private gateway 140, private network 170, server 180, and network 130 to the client device 175.

In embodiments, the server 180 shown in FIG. 1 may be any device capable of communicating with a network, such as network 130, and capable of sending and receiving information to and from another device. For example, in the embodiment shown in FIG. 1, the server 180 may receive a request from the client device 175 through the network 130. In this embodiment, the server 180 may respond to the request by sending information to the client device 175 through the network 130. In an embodiment, the server 180 can communicate with the private gateway 140. The server 180 may be in communication with the data store 185. In embodiments, the server 180 may be in communication with one or more additional devices, such as additional servers. In some embodiments, the server 180 may communicate with one or more additional devices to process a request received from another device. For example, the server 180 in FIG. 1 may be in communication with a plurality of additional servers, at least one of which may be used to process at least a portion of a request from the client device 175.

In embodiments, server 180 comprise a WHOIS server. In this embodiment, server 180 and/or data store 185 may contain records or other information regarding IP addresses. For example, the server 180 may query data store 185 for information regarding one or more IP addresses. Information regarding an IP address can include a domain name associated with the IP address, a registrar of the IP address, one or more name servers for the IP address, one or more statuses, or an expiration date. Server 180 may also contain a name server, such as a domain name system (DNS). In this embodiment, the DNS server may translate one or more domain names and/or hostnames into one or more corresponding IP addresses.

The environment 100 shown in FIG. 1, includes a data store 185. The data store 185 can include numerous separate data tables, databases, or other data storage mechanisms and media for storing data relating to a particular aspect. For example, the data store 185 may include information related to an electronic resource such as IP addresses. The data store may include WHOIS records, allocation information for electronic resources, DNS records, customer information, user information, owner information, traffic data, historical bidding information, or additional information. It should be understood that there can be many other aspects that may need to be stored in the data store 185, such as for page image information and to access right information, which can be stored in any appropriate mechanisms or in additional mechanisms in the data store 185.

The data store 185 is operable, through logic associated therewith, to receive instructions from the server 180, private gateway 140, private network 170, or a combination thereof, and obtain, update, or otherwise process data in response thereto. In one example, a bidder may submit a bid request. In this case, the data store 185 might verify the identity of the bidder and, if the bidder is authorized, allocate one or more exhaustible resources to the bidder based at least in part on the request. In another embodiment, the data store 185 may contain information related to IP address such as routing information, connection information, or tunnel information. In this embodiment, the client device 175 may send a request to an IP address allocated to a customer associated with the user network 110. In this embodiment, the server 180 may be associated with the IP address and receive the request from the client device 175. The server 180 may query the data store 185 to determine where to route the request. In this embodiment, based at least in part on information contained in the data store 185, the server 180 may determine to route the request through the private gateway 140 to the user gateway 120.

The environment in an embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
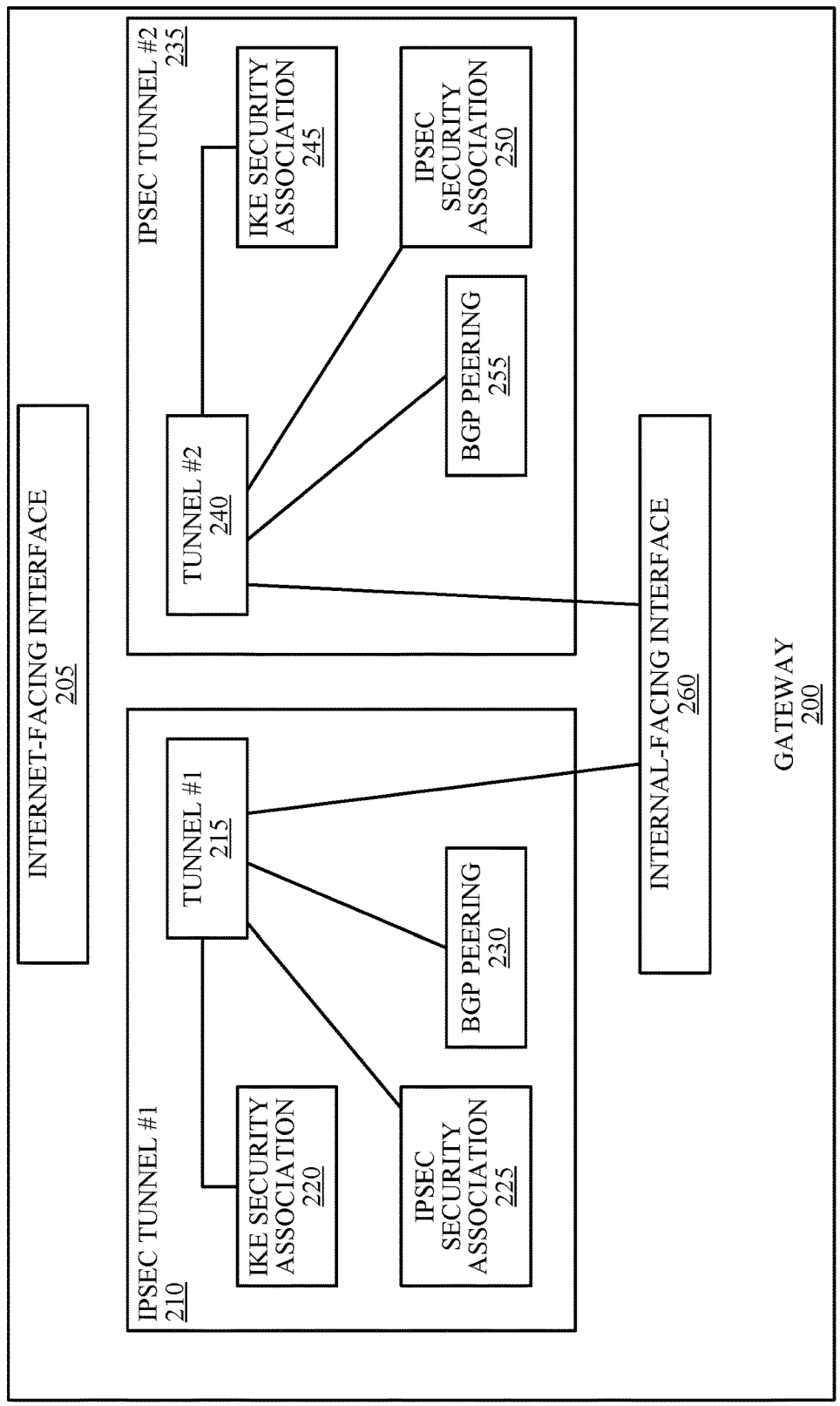
FIG. 2 illustrates an exemplary gateway according to an embodiment.

FIG. 2 illustrates an exemplary gateway 200 according to an embodiment. In the embodiment shown in FIG. 2, the gateway 200 has an internet-facing interface 205, two IPsec tunnels 210, 235, and an internal-facing interface 260. The first IPsec tunnel 210 has a first tunnel 215 that is associated with a first internet key exchange (IKE) security association 220, a first IPsec security association 225, and a first BGP peering 230. The second IPsec tunnel 235 has a second tunnel 240 that is associated with a second internet key exchange (IKE) security association 245, a second IPsec security association 250, and a second BGP peering 255.

The gateway 200 has an internet-facing interface 205, two IPsec tunnels 210, 235, and an internal-facing interface 260. The first IPsec tunnel 210 has a first tunnel 215 that is associated with a first internet key exchange (IKE) security association 220, a first IPsec security association 225, and a first BGP peering 230. The second IPsec tunnel 235 has a second tunnel 240 that is associated with a second internet key exchange (IKE) security association 245, a second IPsec security association 250, and a second BGP peering 255.

The gateway 200 as shown in FIG. 2 comprises an internet-facing interface 205 for communicating via wired or wireless communication. For example, the internet-facing interface 205 may allow for communication over networks via Ethernet, IEEE 802.11 (Wi-Fi), 802.16 (Wi-Max), Bluetooth, infrared, etc. As another example, the internet-facing interface 205 may allow for communication over networks such as CDMA, GSM, UMTS, or other cellular communication networks.

The gateway 200 may support any number of protocols, associations, or other connections. In FIG. 2, the gateway 200 supports at least a first IPsec tunnel 210 and a second IPsec tunnel 235. The first IPsec tunnel 210 shown in FIG. 2 comprises a first tunnel 215. The first tunnel 215 can facilitate communications between at least two networks or devices associated with the gateway 200. The first IPsec tunnel 210 supports an IKE security association 220 which may be required to exchange keys used to establish another connection, such as an IPsec security association. The first IPsec tunnel 210 also supports an IPsec security association 225 which can handle the authentication, encryption, and decryption of packets sent or received by the first tunnel 215. In addition, the first IPsec tunnel 210 shown in FIG. 2 supports BGP peering 230 that may be used to exchange route information between devices associated with the connection. For example, referring back to FIG. 1, if the user gateway 120 supports BGP peering, then route information may be exchanged between the user gateway 120 and the private gateway 140. The first tunnel 215 can send and receive traffic going to and from the IPsec tunnel 210.

In FIG. 2, the gateway 200 supports a second IPsec tunnel 235. The second IPsec tunnel 235 shown in FIG. 2 includes a second tunnel 240. The second tunnel 240 can facilitate communications between at least two networks or devices associated with the gateway 200. The second IPsec tunnel 235 supports an IKE security association 245 which may be required to exchange keys used to establish another connection, such as an IPsec security association. The second IPsec tunnel 235 also supports an IPsec security association 250 which can handle the authentication, encryption, and decryption of packets sent or received by the second tunnel 240. In addition, the second IPsec tunnel 235 shown in FIG. 2 supports BGP peering 255 that may be used to exchange route information between devices associated with the connection. For example, referring back to FIG. 1, if the user gateway 120 supports BGP peering, then route information may be exchanged between the user gateway 120 and the private gateway 140. The second tunnel 240 can send and receive traffic going to and from the IPsec tunnel 235.

In embodiments, the settings associated with the first IPsec tunnel 210 may be different than the settings associated with the second IPsec tunnel 235. For example, a first key related to IKE security association 220 may be distinct from a second key related to IKE security association 245. In an embodiment, an internet protocol (IP) address related to the first BGP peering connection 230 may be different from an IP address related to the second BGP peering connection 255. Likewise, an IP address associated with the first tunnel 215 may be different than an IP address associated with the second tunnel 235, BGP peering connection 230, and BGP peering connection 255. In some embodiments, at least some information between the first IPsec tunnel 210 and the second IPsec tunnel 235 may be common. For example, in one embodiment, an autonomous system number (ASN) associated with BGP peering connection 230 may be the same as an ASN associated with BGP peering connection 235.

The gateway 200 as shown in FIG. 2 comprises an internal-facing interface 260 for communicating via wired or wireless communication. For example, the internet-facing interface 205 may allow for communication over networks via Ethernet, IEEE 802.11 (Wi-Fi), 802.16 (Wi-Max), Bluetooth, infrared, etc. As another example, the internal-facing interface 260 may allow for communication over networks such as CDMA, GSM, UMTS, or other cellular communication networks. The gateway 200 may comprise additional network interfaces for communication over one or more networks or for redundancy.

Figure 3:
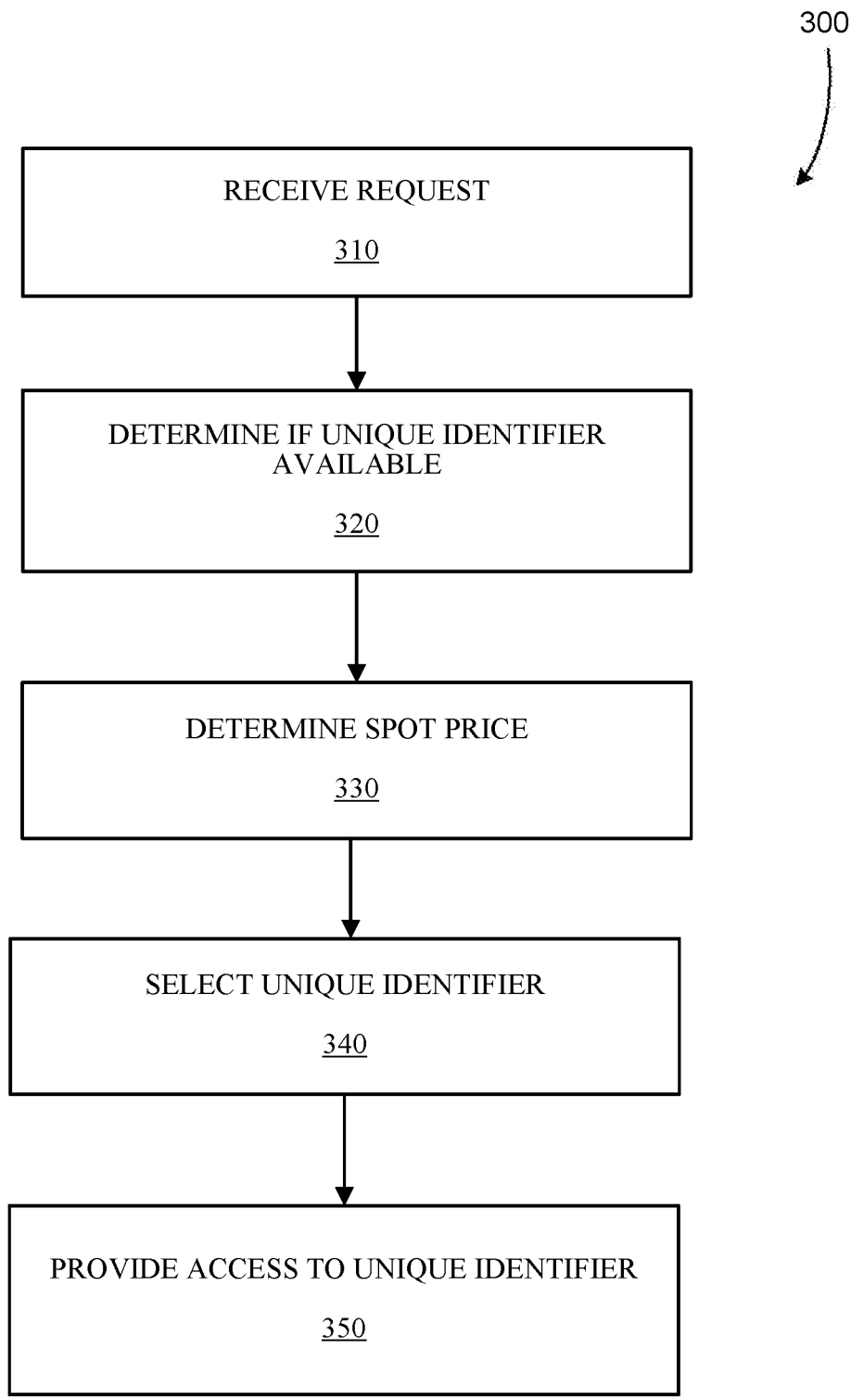
FIG. 3 is a flowchart illustrating a method of managing a spot market for unique identifiers according to an embodiment.

FIG. 3 illustrates a flowchart directed to an example method 300 of managing a spot market for unique identifiers according to an embodiment. Some or all of the method 300 (or any other methods/processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. One of more of the actions depicted in FIG. 3 may be performed by a device such as server 180 shown in FIG. 1 or application server 1008 discussed below in connection with FIG. 10. The code may be stored on a non-transitory computer-readable storage medium, for example, in the form of a computer program comprising a plurality of instructions executable by one or more processors. While the illustrative embodiment described in connection with FIG. 3 describes various aspects of the present disclosure in terms of unique identifiers, it should be understood the method of FIG. 3 may be performed in connection with any electronic resource, including examples discussed above and elsewhere herein. The request may be an electronic request sent over a network, such as a public communications network (e.g. the Internet).

In an embodiment, the method 300 can begin when a request is received 310 indicating that a party, such as an organization, would like to use one or more unique identifiers. For example, in an embodiment, a request is received indicating that a party wishes to use one IPv4 address for a period of time, which may be specified or indefinite, where the IPv4 address has a location corresponding to the United States. In another embodiment, a request may be received specifying that an organization wishes to have IPv4 addresses allocated to the organization for a period of time, such as one year.

Once a request has been received 310, the method 300 proceeds to block 320. In block 320, a determination is made as to whether one or more unique identifiers are available. The determination may be made based at least in part on the criteria provided in the request. For example, if a request indicates that a bidder wants an IPv4 address with a location corresponding to the United States, a data store comprising information for available IPv4 addresses such as a location for the IPv4 addresses may be searched to determine whether at least one IPv4 address having a location corresponding to the United States is available 320. In another embodiment, a request may be received 310 that indicates that a bidder wants an IPv4 address for two years. In this embodiment, a data store comprising information associated with a plurality of unique identifiers may be queried to determine whether at least one IPv4 address is available for at least two years. For example, referring to FIG. 1, server 180 may receive a request from a bidder associated with user network 110 where the request indicates that the bidders wants to use an IPv6 address. In response to receiving the request, server 180 may query data store 185 to determine whether an IPv6 address is available. If at least one IPv4 address meeting the criteria specified in the request is available, then the method 300 proceeds to block 330.

In block 330, a spot price is determined. The spot price may be determined in any suitable manner, such as by accessing a pre-calculated spot price from a data store or by calculating a spot price. The spot price may be calculated using any of a variety of factors. For example, in an embodiment, the spot price is based at least in part on current bids for the unique identifiers. One example of calculating a spot price in such an embodiment is discussed below in connection with FIG. 6. The spot price may be determined based at least in part on criteria provided in the request. For example, in an embodiment, a spot price for IPv4 addresses may be determined based on a length of time specified in the request. In another embodiment, a spot price may be based on the quantity of IPv4 addresses requested. In one embodiment, a spot price may be based on a length of time, a quantity, and/or other factors specified in a request.

In an embodiment, the spot price can be based on whether there is contention for the electronic resources. For example, in one embodiment, as long as IPv4 addresses are available, then bidders may be allocated a requested number of IPv4 addresses for a bid price specified in a bid request. If, however, the requested number of IPv4 addresses are not available then a contention-based pricing scheme may be used to determine whether the current bidder should be allocated the requested number of IPv4 addresses. If a determination is made that the current bidder should be allocated one or more IPv4 addresses, then the current bidder may be allocated the one or more IPv4 addresses. In doing so, the one or more IPv4 addresses may be deallocated from another user to which the one or more IPv4 addresses had previously been allocated. One example of a contention-based pricing scheme is described in connection with FIG. 6. Other variations are within the scope of this disclosure.

After a spot price is determined 330, in an embodiment, the method 300 proceeds to block 340. In block 340, one or more unique identifiers are selected. A selected unique identifier may be based at least in part on criteria provided in the request. A selected unique identifier may also be based at least in part on other criteria not provided in the request. For example, in an embodiment involving a request for one IPv4 address having a location corresponding with the United States and being available for two years, the IPv4 address may be selected from five IPv4 addresses meeting the request criteria. In this embodiment, the IPv4 address may be selected from the five IPv4 addresses based on the length of time since the IPv4 addresses were last used. For example, the selected IPv4 address may have been available for the longest period of time since last being used. Such an embodiment may be beneficial for transitioning the allocation of electronic resources from one party to another party because it may allow network traffic intended for the first party to subside before an electronic resource is allocated to the other party.

Once at least one unique identifier has been selected 340, in an embodiment, the method 300 proceeds to block 350. In block 350, the selected unique identifier or unique identifiers can be allocated. For example, in an embodiment discussed above, access to the selected IPv4 address is provided to the lessee for two years. In an embodiment, at the end of the two years the selected IPv4 address is automatically deallocated. In another embodiment, the selected IPv4 address remains allocated for one or more periods of time after the two year expiration based at least in part on a current spot price. In an embodiment, the selected IPv4 address remains allocated for one or more periods of time after the two year expiration based at least in part on the previously determined spot price. In some embodiments, access to the selected IPv4 address continues to be granted after the two years for a determined period of time and a new spot price is determined for the IPv4 address.

Figure 4:
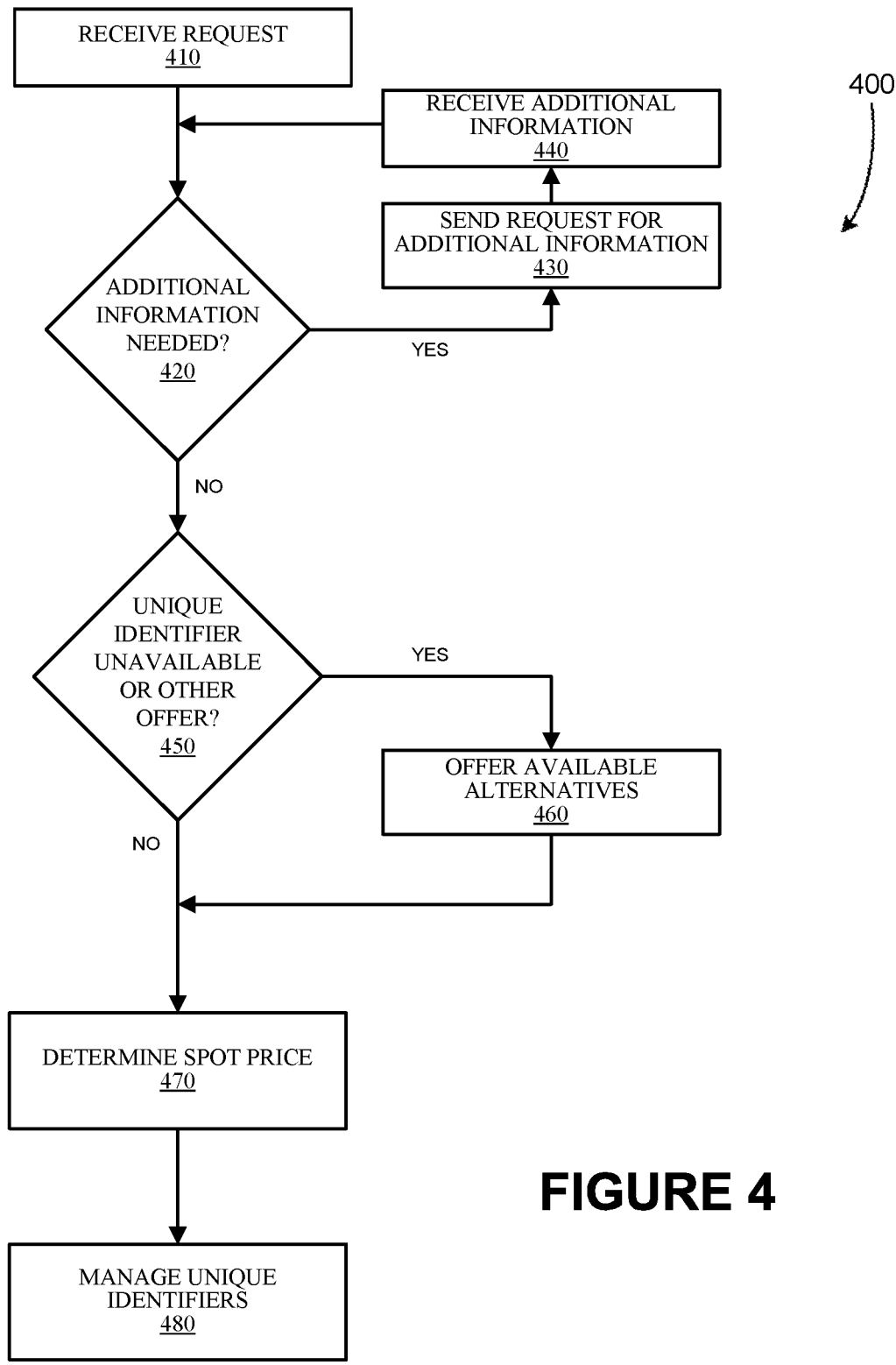
FIG. 4 is a flowchart illustrating a method of managing a spot market for unique identifiers according to an embodiment.

Referring now to FIG. 4, a flowchart is illustrated that is directed to a method 400 of managing a spot market for unique identifiers according to an embodiment. The description of the method 400 shown in FIG. 4 will be made with respect to FIG. 1 and FIG. 10 which illustrate aspects of example environments for implementing aspects in accordance with various embodiments. It should be noted, however, that the scope of the present disclosure is not limited to the explicit environment illustrated in FIG. 1 or in FIG. 10, but in other environments, including variations of FIG. 1 or FIG. 10 not explicitly illustrated or described.

The method 400 shown in FIG. 4, in an embodiment, begins when a request for a unique identifier is received 410. A request can be received by any number of electronic devices in communication with a sending device. For example, in FIG. 10 the web server 1006 may receive a request from the client device 1002 through the network 1004. In another embodiment, the application server 1008 may receive a request from the client device 1002 through the network 1004. For example, the application server 1008 may receive a request from the client device 1002 and the request may indicate that the requestor wants to lease ten IPv4 addresses for one week.

A request may comprise any number or selection of criteria. In an embodiment, a request includes identification information that identifies the electronic device making the request. For example, the identification information can include any information that enables the receiving device to determine the identity of the sending device or allows the receiving device to communicate with the sending device. For example, in the embodiment shown in FIG. 10, a request sent from the client device 1002 and received by the web server 1006 may include information—such as the IP address of the client device 1002—that allows the web server 1006 to communicate with the client device 1002.

In an embodiment, a request includes an identification of the party making a request (i.e., a requestor). For example, a request may contain a requestor's name, an associated company, a billing address, a mailing address, one or more phone numbers, an account number, other contact information, or a combination thereof. In embodiments, authentication information, such as a username and a password, may be included in a request. A request may contain a unique identification number that can be used to authenticate the party making a request. For example, in an embodiment, before making a request a party creates an account and receives a unique identification number that the party can submit with a request to verify the identity of the party.

In an embodiment, a request contains payment information. For example, a request may contain a credit card number and expiration date that can be used by the receiving device to process any payments related to the request. A request may include a bank account number and a routing number that can be used to electronically deduct any payments related to the request. In an embodiment, the request includes information indicating that any payments related to the request should be taken from a pre-funded balance. In another embodiment, the request comprises information including that payments related to the request should be billed to the party making the request or to an approved third-party.

A request may refer to an internal reference that can be used to determine a payment method for any payments related to the request. For example, in an embodiment, prior to sending a request a requestor may have previously provided a payment method such as a credit card type, a credit card number, and an expiration date. In such an embodiment, the payment method may be assigned an internal reference number that can be included in a request associated with the requestor to indicate that the payment method should be used for any payments related to the request. In an embodiment, multiple payment methods are included in a request.

In some embodiments, a request is intended to include pricing information. For example, a request may contain a maximum price that the requestor is willing to pay for one or more unique identifiers according to criteria specified in the request. In an embodiment, a maximum price comprises a total price that a requestor is willing to pay for a total number of unique identifiers meeting the criteria specified in a request. For example, a request may include a maximum price of $100 for six unique identifiers. Thus, in this embodiment, if six unique identifiers are available, then a maximum price of $100 will be paid by the requestor (i.e. the total bill will be $100 or less). In another embodiment, a maximum price comprises the highest price that a requestor is willing to pay for each unique identifier that meets the criteria specified in a request. For example, a request may include a maximum price of $25 for each of ten unique identifiers. Thus, in this embodiment, if ten unique identifiers are available then a maximum bill of $250 will be paid by the requestor.

In some embodiments, a request contains a number of unique identifiers that are wanted by the requestor or a third-party for which the requestor is making a request. For example, a request may provide that a requestor wants a single unique identifier. A request may provide that a requestor wants a specified quantity of unique identifiers, such as 5, 10, or 20 unique identifiers. In embodiments, a request may include information indicating that the requestor wants a block of unique identifiers. For example, a request may provide that a requestor wants a block of twenty-four IPv4 addresses.

In an embodiment, a request includes a type of unique identifier that is being requested. For example, the type of unique identifier may be an IPv4 address, an IPv6 address, or a telephone number. In embodiments, a type of unique identifier may be any type of unique identifier that comprises a finite number of unique identifiers. A request may include multiple types of unique identifiers according to an embodiment. For example, in an embodiment, a request contains information indicating that a requestor wants two IPv4 addresses and six IPv6 addresses. In another embodiment, a request provides that a requestor wants a block of IPv4 addresses and two telephone numbers.

A request may indicate whether a portion of at least two unique identifiers must be contiguous. In an embodiment, the trailing letters or digits of two or more unique identifiers must be contiguous according to a request. For example, in an embodiment a request provides that five unique identifiers each of the trailing digits of the unique identifiers being contiguous are needed. In this embodiment, the contiguous criteria may be met if the trailing digits of the unique identifiers are adjacent. Thus, according to this embodiment, if the last two digits of the unique identifiers were "11", "12", "13", "14", and "15," then the condition was met. In an embodiment a request may provide that a block of contiguous IP addresses are needed. For example, a request may provide that an CIDR /27 block of IPv4 addresses (32 contiguous IPv4 addresses) may be needed. A contiguous block of IP addresses may be beneficial at least because less configuration may be required for various devices when the block of IP addresses are contiguous. For example, if a large block of IP addresses is non-contiguous, a gateway or a router providing routing information for the IP addresses may not have sufficient capacity (i.e. sufficient memory) to route each individual IP address. However, if the large block of IP addresses is contiguous, then a gateway or router providing routing information may reference a range of the IP addresses rather than each individual IP address and, thereby, have sufficient capacity. In embodiments, the leading letters of digits of two or more unique identifiers must be contiguous according to a request. Also, any number of letters or digits contained in two or more unique identifiers may be required to be contiguous according to a request.

In an embodiment, a request indicates that a portion of at least one unique identifier must have a certain value. In an embodiment, the leading letters or digits of one or more unique identifiers may need to be the same according to a request. For example, in an embodiment a request provides that a telephone number needs to have an area code of "202". In another embodiment, the trailing letters or digits of one or more unique identifiers may need to be the same according to a request. For example, a request may indicate that four telephone numbers are needed and each of the four telephone numbers must end with "5000". In other embodiments, any number of letters or digits contained in one or more unique identifiers must be the same according to a request. For example, a request may provide that a telephone number having a prefix "949" is requested. In this embodiment, a phone number having an area code of "202" and a prefix of "949" would satisfy this requirement.

In an embodiment, a request indicates whether a requestor wishes to lease or purchase one or more unique identifiers. For example, a request may indicate that three unique identifiers are needed and that the requestor wishes to purchase the three unique identifiers. In another embodiment, a request indicates that two blocks of IPv4 addresses are needed and that the requestor wishes to lease the two blocks of IPv4 addresses. A request may indicate that a requestor wants to purchase or lease one or more unique identifiers, or both. For example, in an embodiment a request indicates that five IPv4 addresses are needed and that the requestor wishes to purchase three of the IPv4 addresses and lease two IPv4 addresses. In another embodiment, a request indicates that two blocks of IPv4 addresses are wanted and that the requestor prefers to lease one block of IPv4 addresses and purchase the other block of IPv4 addresses, but that the requestor is willing to purchase both blocks of IPv4 addresses for a specified maximum price.

According to an embodiment, a request indicates a time frame that one or more unique identifiers need to be leased. For example, in an embodiment, a request provides that a number of unique identifiers are needed immediately for one year. In another embodiment, a request indicates that a number of unique identifiers are needed in two days beginning at 1:00 PM EST and lasting for five years. In various embodiments, a request can include any number of minutes, hours, days, months, years, or some combination thereof. Furthermore, a request may provide a repetitive time frame for which one or more unique identifiers are needed. For example, in an embodiment, a request includes information indicating that four blocks of IPv4 addresses are needed every first week of a month. In another embodiment, a request provides that fifty-four IPv6 addresses are needed from June thru July every year.

In an embodiment, a request indicates that the request should remain valid until one or more specified criteria are met. A request may provide that a number of unique identifiers are needed until the request is cancelled or until the yearly rate for each of the number of unique identifiers is exceeded. For example, in an embodiment, a request provides that a block of twenty-four IPv4 addresses are wanted on a monthly basis for as long as the total monthly cost does not exceed $150. In this way, a request may continue indefinitely until one or more criteria are met. In some embodiments, a request may continue even after one or more criteria have not been met. For example, in an embodiment, a request indicates that ten IPv4 addresses are wanted on a daily basis whenever the total daily price is less than $10. In this embodiment, on days where the spot price for the ten IPv4 addresses are less than $10 then the requestor may receive access to the ten IPv4 addresses and is charged the spot price for the ten IPv4 addresses. Likewise, in this embodiment, on days when the spot price for the ten IPv4 addresses is $10 or greater, the requestor may not get access to the IPv4 addresses and is not charged.

In an embodiment, a request indicates whether or not the request should automatically renew. A request, for instance, may specify that a request should automatically renew if the spot price at the time of renewal is below a maximum price specified in the request. For example, a request may provide that four telephone numbers are wanted for a one year term with a maximum price of $200. The request may further indicate that the four telephone numbers should automatically be renewed for another year if the spot price at the time of renewal is $200 or less. A request may provide that the request should automatically renew at the current spot price at the time of renewal. For example, in the embodiment discussed above, the request may indicate that the four telephone numbers should automatically renew at the prevailing spot price at the time of renewal.

As another example, a request may indicate that the request should automatically renew if the current spot price is below a maximum renewal price at the time of renewal. In an embodiment, a maximum renewal price is a specified dollar amount. In another embodiment, a maximum renewal price is a percentage of another price, such as a maximum price, provided in the request. For example, in an embodiment, a request provides a maximum price of $150 for a number of unique identifiers for a specified period of time and further provides that if the spot price is within 125% of the maximum price specified in the request at the time of renewal then the request should automatically renew. A request may indicate an initial period of time and provide that a renewal time period should be a different period of time. For example, in an embodiment, a request provides that an IPv6 address is wanted for one year and, at the end of that year, should automatically renew at the current spot price for the request but in monthly increments.

In an embodiment, a request may indicate a garbage traffic threshold for one or more unique identifiers. A garbage traffic threshold can include any number of factors or any combination of factors. For example, in an embodiment a garbage traffic threshold is based at least in part on the last time the unique identifier was used. Thus, in an embodiment, the longer a unique identifier has not been used, the lower the unique identifier's garbage traffic value. In another embodiment, a garbage traffic threshold may be based at least in part on the amount of traffic that the unique identifier receives when not assigned to a particular requestor. For example, a telephone number that receives an average of ten calls each day when not assigned to a requestor may have a higher garbage traffic value than a telephone number that receives an average of three calls each day when not assigned to a particular value.

A unique identifier's garbage traffic value may change over time as factors related to the garbage value changes. For example, if a telephone number initially has a garbage traffic value based on an average of ten calls per day when not assigned to a requestor, the garbage traffic value may be reduced if the average number of calls per day reduces to five calls per day. Thus, in embodiments, a garbage traffic value may be based on the number of hits, calls, or otherwise that a unique identifier receives when not assigned to a requestor.

In an embodiment, a garbage traffic value may be based on a historical number of accesses. For example, a garbage traffic value may be based on how many times traffic was sent to the unique identifier over a given time period. In another embodiment, a garbage traffic value may be based on the amount of data that has been sent to the unique identifier in a period of time. In embodiments, a garbage traffic value may be based on a combination of factors described herein or other factors, or both.

In embodiments, fewer or additional criteria may be included in a request. A request may include any combination of factors described herein or any combination of additional factors, or both. In embodiments, the complexity of a request may vary. For example, in an embodiment, a request provides that one IPv4 address is wanted. In another embodiment, a request states that three blocks of IPv4 addresses, each block having 24 IPv4 addresses, is wanted. Furthermore, this request provides that the requestor wants to lease the three blocks of IPv4 addresses and pay a total maximum price of $200 for a six-month term. In addition, the request provides that the request should automatically renew for one-month periods as long as the monthly price is less than $50. One of ordinary skill in the art will appreciate that there are numerous combinations of criteria that can be included in a request and that the complexity of a request may vary significantly.

In embodiments, a request can be in any number of formats or written in any number of languages. A request may be written in a declarative language such as a tag-based language. A request may be written in a procedural language. A request can be written in a combination of declarative languages, procedural languages, or both. In various embodiments, a request may be in one or more of the following languages, including but not limited to: ActionScript®, ASP, C, C++, HTML, JAVA, JavaScript, JSP, JSON, MXML, PHP, SOAP, XML, or XSLT. Furthermore, a request may be stored in one or more text files. In embodiments, a request may be made through one or more application programming interfaces (APIs). In embodiments, a request may be stored in one or more data stores. A request may be in an archive or compressed format, or both, such as JAR, ZIP, RAR, ISO, or TAR. A combination of languages, formats, and/or data stores may be used to define a request according to various embodiments.

Referring back to FIG. 4, after receiving a request 410, the method 400 proceeds to block 420. In block 420 a determination is made as to whether additional information is needed from the requesting device. If it is determined that additional information is needed, then the method 400 proceeds to block 430. Otherwise, the method 400 proceeds to block 450.

For example, as discussed above, in an embodiment the application server 1008 receives a request from the client device 1002 and the request indicates that the requestor wants to lease ten IPv4 addresses for one week. In an embodiment, the request may be sent from the client device 1002 to the application server 1008 via an application programming interface (API) call. A determination may then be made as to whether additional information is needed. In an embodiment, if the API call does not contain the necessary parameters or otherwise is incorrect, then the request fails. In one embodiment, if a request fails a notification indicating that the request is incomplete or inaccurate is provided to the device sending the request. In an embodiment, the application server 1008 may determine that additional information is needed because the request did not provide a username and password. Thus, according to the method 400 shown in FIG. 4, the method 400 proceeds to block 430.

A determination as to whether additional information is needed can be based on any number of factors. A determination as to whether additional information is needed may be based at least in part on the information received in the request. For example, a request may be based on an identification of the electronic device making the request. In an embodiment, additional information may be required if the electronic device has been placed on a watch list. In such an embodiment, the receiving device may want additional information further proving the identity of the device or the requestor.

In an embodiment, a determination as to whether additional information is needed may be based at least in part on an identification of the party making a request (i.e. the requestor). For example, if a request does not contain a requestor's name, then it may be determined that additional information is needed. In an embodiment, if a request includes a payment method that has a billing address that does not correspond with the billing address provided in the request, it may be determined that additional information is needed. Likewise, if an account number provided in a request does not exist or if the account number does not match with the requestor's name, then it may be determined that additional information is needed. In embodiments, authentication information, such as a username and a password, must be included in a request and must be correct; otherwise, it may be determined that additional information is needed. In an embodiment, a unique identification number that identifies the party making a request must be provided or it may be determined that additional information is needed.

In an embodiment, it may be determined that additional information is needed if a request does not provide sufficient payment information or if a request provides incorrect payment information. The payment information may be verified to confirm that the payment information provided in the request is valid. In an embodiment, one or more payment methods may be preauthorized. If one or more payment methods are unable to be preauthorized or if a payment method is invalid, then it may be determined that additional information is needed. Additional information may also be needed if a pre-funded balance is below a threshold value. Furthermore, in an embodiment, additional information may be needed if a request indicates that payments should be billed but the account has not been authorized for billing.

In embodiments, it may be determined that additional information is needed if a request fails to provide sufficient pricing information. For example, in an embodiment, additional information may be needed if a maximum price is not specified in a request. In another embodiment, additional information may be needed if a price per unique identifier is not provided in a request.

In an embodiment, it may be determined that additional information is needed if a request fails to provide a number of unique identifiers that is wanted by the requestor or a third-party for which the requestor is making a request. In another embodiment, it may be determined that additional information is needed if a type of unique identifier is not specified in a request. Furthermore, in embodiments, it may be determined that additional information is needed if a request does not indicate whether a requestor wishes to lease or purchase one or more unique identifiers.

In some embodiments, it may be determined that additional information is needed if a request does not indicate a time frame that one or more unique identifiers needs to be leased. In another embodiment, it may be determined that additional information is needed if a request does not specify whether a request should automatically renew. In an embodiment, it may be determined that additional information is needed if a garbage traffic threshold for one or more unique identifiers indicates is not indicated in a request.

In embodiments, a determination as to whether additional information is needed may be based on fewer or additional criteria that can be included in a request. A determination as to whether additional information is needed may be based on any combination of factors described herein or any combination of additional factors, or both.

One or more default values may be assigned to criteria according to various embodiments and used in determining whether additional information is needed. If a request does not contain a needed parameter, then a default value may be assigned for this parameter. For example, in an embodiment a request does not contain a quantity of unique identifiers that the requestor wishes to lease; thus, a default value of one is assigned to the quantity parameter. A default value can be assigned to one or more of the criteria discussed above or additional criteria. For example, in an embodiment, a request contains a username, a password, and a maximum price. In such an embodiment, a default value of one block of twenty-four may be assigned to the quantity parameter, a default value of IPv4 addresses may be assigned to the type of unique identifiers parameter, a default value of lease may be assigned to a purchase or lease parameter, and a default value of one day may be assigned to a timing parameter.

In embodiments, one or more default values may be based at least in part on historical information and used in determining whether additional information is needed. A default value may be based at least in part on previous requests associated with a plurality of accounts. For example, in an embodiment, a default quantity value may be determined based on the average quantity specified in previous requests from any number of accounts. A default value may be determined based at least in part on previous requests associated with a particular account. For example, a default quantity value may be determined based on the quantities historically requested in previous requests associated with an account. A default value may be based on one or more default settings previously provided by a requestor. For example, in an embodiment, a requestor can specify a default quantity that should be included in a request that does not contain a quantity.

Multiple default values may be determined for a request according to various embodiments. For example, in an embodiment, a requestor previously determined that a default quantity should be ten unique identifiers and that a default type should be IPv4 addresses. Thus, in this embodiment, if a request is received from this requestor that includes a maximum price but does specify a quantity or type of unique identifier, then the request may be processed based at least in part on the maximum price specified in the request and the default values for ten IPv4 addresses. Therefore, in an embodiment that requires a request to have a maximum price and a quantity, additional information may not be needed because the default values provide information regarding the quantity.

Referring back to FIG. 4, after making a determination as to whether additional information is needed from the requesting device 420, the method 400 proceeds to either block 430 or block 450. If it is determined that additional information is needed, then the method 400 proceeds to block 430; otherwise, the method 400 proceeds to block 450.

In block 430, a request for additional information is sent to the requesting device. For example, in the embodiment discussed above regarding the request to lease ten IPv4 addresses for one week, it was determined that additional information was required because the request did not provide a username and password. Thus, in this embodiment, the application server 1008 requests additional information from the client device 1002.

Once a request for additional information has been sent 430, the electronic device sending the request for additional information waits for a response 440. For example, in the environment previously discussed above in connection with FIG. 10, the application server 1008 waits for a response from the client device 1002.

Returning to FIG. 4, once a response is received 440, the method proceeds to block 420 where a determination is again made as to whether additional information is needed. If it is determined that additional information is needed, then the method 400 proceeds to block 430; otherwise, the method 400 proceeds to block 450. For example, in the embodiment discussed above, the application server 1008 received a username and password (additional information) 140 in response to the request for additional information 430. In this embodiment, the provided username and password may need to be verified in order to determine whether additional information is needed 420. For example, in an embodiment, it may be determined that the username and password is a valid username and password associated with an active account; thus, the method proceeds to block 450.

In block 450, a determination is made as to whether unique identifiers are available or whether other offers are available, or both. In embodiments, if it is determined that unique identifiers are available, then the method 400 proceeds to block 470. In other embodiments, if it is determined that unique identifiers are available and another offer is also available, then the method 400 proceeds to block 460. In an embodiment, if a unique identifier is not available then the method 400 proceeds to block 460. Thus, in various embodiments, the method 400 may proceed to either block 460 or block 470 based at least in part on what is determined in block 450.

For example, as discussed above, in an embodiment the application server 1008 receives a request from the client device 1002 to lease ten IPv4 addresses for one week. In this embodiment, once a determination is made that additional information is not needed 420, the application server 1008 determines whether unique identifiers having the criteria specified in the request are available 450. For example, the application server 1008 may query data store 1010 to determine whether ten IPv4 addresses are available to be leased for the next week. If at least ten IPv4 addresses are available, then a spot price is determined 470. If at least ten IPv4 addresses are not available, then alternative offers that are available are provided 460. In an embodiment, if one or more offers are available, then one or more of these offers may be provided 460.

In another embodiment, the application server 1008 may query data store 1010 to determine whether an offer should be presented to the requestor. For example, in an embodiment, the application server 1008 may query data store 1010 to determine that twenty IPv4 addresses are available to be leased for the next week. In another embodiment, the application server 1008 may query data store 1010 to determine that a promotional price can be offered on ten IPv4 addresses that are leased for at least a month. If it is determined that one or more offers are available, then at least one of the offers may be provided to the requestor 460.

An offer may be presented to an organization that manages units of an electronic resource, such as a resource provider. For example, an offer can include a presentation to a resource provider from the bidder that the resource provider can accept or reject. The offer may be related to a request from a bidder. In one embodiment, an offer includes electronic resources that is similar to the requested electronic resources but one or more of the criteria specified in the request varies. For example, if a request indicates that a bidder wants an IP address for a month, then the bidder may make an offer to the resource provider for a year-long agreement. An offer may be associated with a lower price per term than specified in a request. For example, if a request indicates that a bidder is willing to pay $10 for a one month allocation of an electronic resource, then the bidder may make an offer to the resource provider for a three month allocation of the electronic resource for a total price of $20 which is less than $10 per month. An offer may be based on electronic resources that are available. For example, if a request indicates that a bidder wants a contiguous block of 256 IPv4 addresses and a contiguous block of 256 IPv4 addresses is not available, then the bidder may make an offer to the resource provider for two contiguous blocks of 128 IPv4 addresses that are available. Other variations are within the scope of this disclosure.

Any number of factors may be used to determine whether unique identifiers are available or whether additional offers should be presented. One or more factors may be based at least in part on information received in the request. For example, if a maximum price per unique identifier and a quantity of unique identifiers were specified in a request, then the determination as to whether unique identifiers are available may include determining whether at least the specified quantity of unique identifiers are available for price less than or equal to the maximum price. In another embodiment, if a type of unique identifier and a quantity of unique identifiers were specified in a request, then the determination as to whether unique identifiers are available includes determining whether at least the specified quantity of that type of unique identifier are available. For example, if a request provides that four IPv4 addresses are needed, then the determination may include determining whether at least four IPv4 addresses are available.

In embodiments where a request or default value specifies that at least two unique identifiers should be contiguous, a determination as to whether unique identifiers are available may include determining whether at least two unique identifiers that are contiguous are available. For example, in an embodiment, a request provides that three telephone numbers are wanted and that the telephone numbers need to end in contiguous digits. In this embodiment, if the only telephone numbers available ended in "15", "16", and "18", then it may be determined that the unique identifiers are not available. If, on the other hand, telephone numbers having digits ending in "14", "15", and "16" are available, then it may be determined that the unique identifiers are available.

In an embodiment where a request or default value provides that a portion of at least one unique identifier should have a certain value, a determination as to whether unique identifiers are available may include determining whether at least one unique identifier has the portion of the identifier that corresponds with the request. For example, in an embodiment where a request provides that a telephone number needs to have an area code of "202", a determination as to whether unique identifiers are available can include querying one or more databases to determine whether a telephone number having a "202" area code is available.

If a request or default value indicates that a requestor wishes to purchase one or more unique identifiers, then a determination as to whether unique identifiers are available may include determining whether one or more unique identifiers are available for purchase. In an embodiment, if a request or default value provides that a requestor wishes to lease one or more unique identifiers, then a determination as to whether unique identifiers are available may include determining whether one or more unique identifiers are offered for lease during a time frame specified in the request or in a default value.

In an embodiment, a garbage traffic threshold, such as described above, may be specified in a request. In such an embodiment, a determination as to whether unique identifiers are available may include determining whether one or more unique identifiers are available that have a garbage traffic value below the threshold specified in the request. For example, in an embodiment, a request provides that a unique identifier needs to have an average of less than fifty requests per day since becoming available and further provides that the unique identifier should not have been previously assigned in the last sixty days. In such an embodiment, any unique identifiers that have received, on average, fifty or more requests since becoming available may be considered unavailable according to the criteria specified in the search request. Similarly, any unique identifiers that are currently available but have previously been assigned in the past sixty days may be considered unavailable according to the criteria specified in the search request. Thus, such an embodiment, determining whether a unique identifier is available comprises querying one or more data stores to determine if a unique identifier is available that has not been previously assigned in the past sixty days and has not received, on average, fifty or more requests since becoming available.

In various embodiments, a determination as to whether unique identifiers are available may be based at least in part on one or more internal constraints. For example, in an embodiment, an internal constraint may be used to filter any unique identifiers that are currently available but have become available in the last thirty days. Such internal constraints may be useful for, among other things, providing a better customer experience because less unwanted traffic may be sent to a unique identifier that has not been used for a specified period of time. Thus, in an embodiment, an internal constraint may add additional criteria to a request that needs to be met in order for a unique identifier to be considered available.

Figure 5:
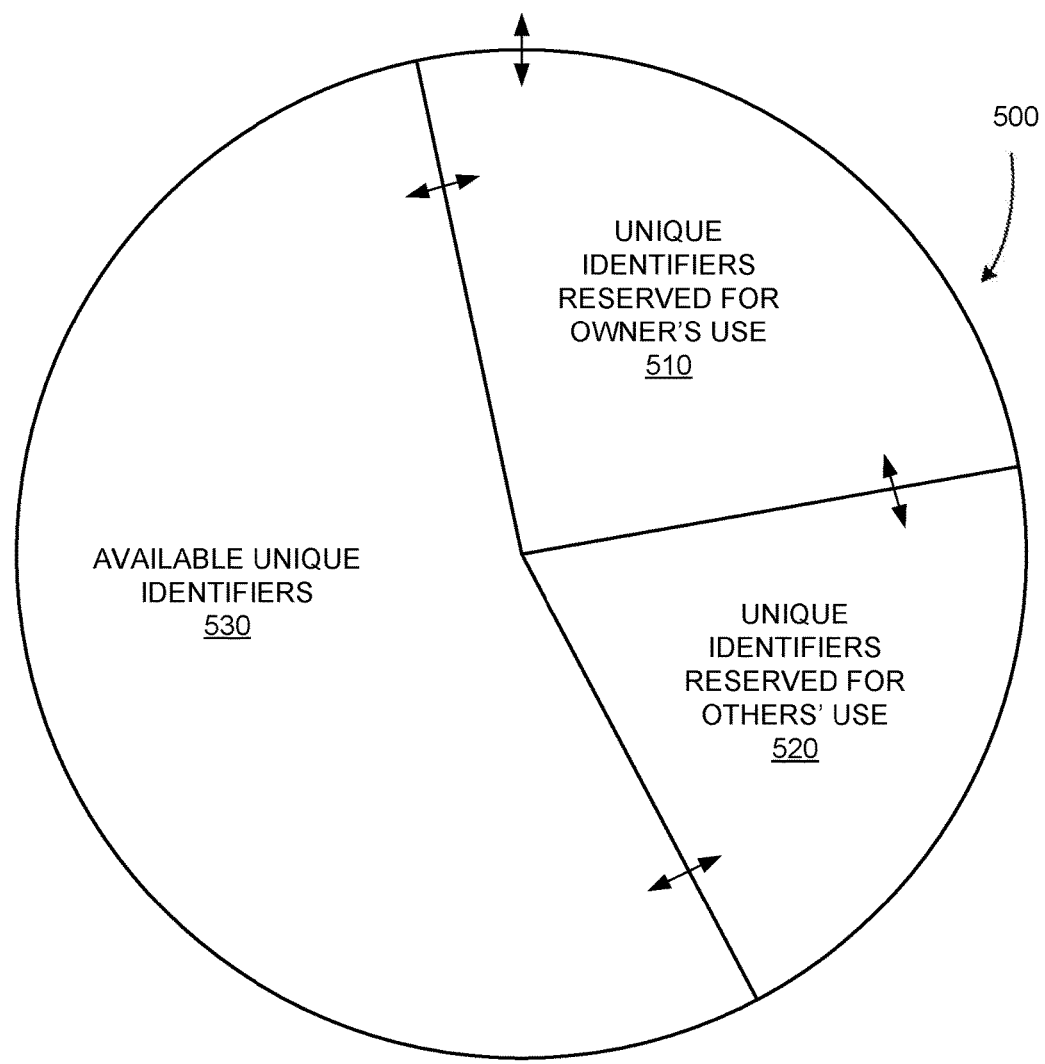
FIG. 5 is a pie chart illustrating an internal constraint for determining whether one or more unique identifiers are available according to an embodiment.

FIG. 5 presents a pie chart 500 illustrating an example internal constraint for determining whether one or more unique identifiers are available according to an embodiment. The pie chart 500 in FIG. 5 depicts three categories of unique identifiers owned by an owner. One category of unique identifiers comprises those unique identifiers reserved for the owner's use 510. Unique identifiers in this category 510 may be considered unavailable for at least a period of time because they are reserved for use by an owner. For example, a party may own 16,777,216 IPv4 addresses (a CIDR /8 block) but set aside 3 million of these IPv4 addresses for internal use. Thus, in this embodiment, even if the owner is actually using only 100,000 of the one million reserved IPv4 addresses, a maximum of 13,777,216 IPv4 addresses may be available for lease or purchase by a third-party because of the internal constraint.

As shown in FIG. 5, in an embodiment, one or more unique identifiers may be reserved for another's use 520. The owner of the IPv4 addresses may, for example, provide computing resources as a service to third parties, such as by allowing third parties to set up computer networks in data centers of the owner. IPv4 addresses may, therefore, be reserved for such third party use. Unique identifiers in this category 520 may also be considered unavailable for at least a period of time because they are reserved for another's use. For example, of the CIDR /8 block, two million may be reserved for third-party use even though, at a given time only one million may be actually used by third parties.

FIG. 5 further illustrates an embodiment where multiple internal constraints may exist. For example, in FIG. 5, the pie chart 500 may represent the total number of unique identifiers that a party owns or has access to. In this embodiment, a portion of the total number of unique identifiers that the party owns or has access to may be reserved for the party's use 510. Another portion of the total number of unique identifiers may be reserved for one or more third-party uses 520. The remaining portion of the total number of unique identifiers 530 may be considered available, such as for lease or purchase. Thus, in an embodiment, a determination as to whether unique identifiers are available or whether additional offers are available may be based at least in part one or more internal constraints.

As demonstrated by the various arrows in FIG. 5, the number of unique identifiers in one or more categories of unique identifiers may vary over time. For example, the number of unique identifiers reserved for an owner's use 510 may increase or decrease based on the demands of the owner. The owner may, for instance, use more and more IPv4 addresses as its operational systems grow in size and complexity. In this embodiment, as demand increases for an owner, unique identifiers reserved for other's use 520 or unique identifiers considered to be available 530, or both, may be moved into category 510. Similarly, as demand decreases for an owner, one or more unique identifiers in category 510 may be placed into category 520 or category 530, or both. In another embodiment, the number of unique identifiers reserved for other's use 520 may be increased or decreased for any number of reasons and, in response, one or more unique identifiers may be added to or removed from category 530 or category 510, or both. Thus, in embodiments, the proportionality of the number of unique identifiers considered available as compared to the total number of unique identifiers that a party owns or has access to may vary according to one or more internal constraints.

In one embodiment, the available unique identifiers 530 may be further divided into one or more subcategories. The available unique identifiers 530 may be divided into subcategories based on time. For example, in an embodiment, one subcategory may contain unique identifiers that are available for one month and another subcategory may contain unique identifiers that are available for one year. In another embodiment, one subcategory of available unique identifiers 530 may comprise CIDR /24 blocks of IPv4 addresses, a second subcategory may contain CIDR /27 blocks of IPv4 addresses, and a third subcategory may contain CIDR /30 blocks of IPv4 addresses. In embodiments, the available unique identifiers 530 may be subdivided into additional categories based on any factor or set of factors disclosed herein. In an embodiment, multiple spot markets may exist for the available unique identifiers 530. For example, in embodiments, a spot market can exist for each subcategory of available unique identifiers.

As illustrated by the arrow intersecting the circumference of the circle enclosing the pie chart, the total number of unique identifiers may vary over time. For example, if a unique identifier is purchased by a third party, then the available number of unique identifiers in category 530 may be reduced. In an embodiment, an owner may acquire additional unique identifiers from a third party and, thus, the total number of unique identifiers shown in the pie chart 500 may change over time. In this embodiment, acquired unique identifiers may be placed in one or more categories.

In another embodiment, an internal constraint may override one or more criteria specified in a request. In other embodiments, a request may override one or more internal constraints. For example, an internal constraint may provide that a unique identifier needs to receive less than two hundred access attempts for the past seven days. In this embodiment, a request may include criteria specifying that a unique identifier needs to receive less than five hundred access attempts for the past seven days. According to an embodiment, this criteria specified in the request may be overridden by the internal constraint such that only unique identifiers having less than two hundred access attempts for the past seven days are considered available. In another embodiment, the criteria in the request may override the internal constraint such that unique identifiers having less than five hundred access attempts for the past seven days are considered available even though the internal constraint provides that only unique identifiers having less than two hundred access attempts for the past seven days should be considered available. Other internal constraints may include, but are not limited to, a number of calls or hits a unique identifier receives within a period of time, or an amount of data that has been sent to a unique identifier over a period of time. Numerous potential internal constraints are disclosed herein or will be apparent to one of skill in the art.

Referring back to FIG. 4, after a determination is made as to whether a unique identifier is available or whether additional offers are available, or both, the method 400 proceeds to either block 460 or block 470. In embodiments, if it is determined that unique identifiers are available, then the method 400 proceeds to block 470. In other embodiments, if it is determined that unique identifiers are available and another offer is also available, then the method 400 proceeds to block 460. In an embodiment, if a unique identifier is not available then the method 400 proceeds to block 460. Thus, in various embodiments, the method 400 may proceed to either block 460 or block 470 based at least in part on what is determined in block 450, as illustrated in the Figure.

In block 460, one or more alternative offers are presented. In an embodiment, one or more unique identifiers may be offered. For example, in the embodiment discussed above regarding the request to lease ten IPv4 addresses for one week, it may be determined that only seven of the ten requested IPv4 addresses are available. In an embodiment, the seven available IPv4 addresses are offered to the party making the initial request. Thus, in this embodiment, the application server 1008 may send one or more alternative offers for the seven IPv4 addresses to the client device 1002.

Any number of factors may be used to determine one or more alternative offers. One or more factors may be based at least in part on information received in the request. In some embodiments, an alternative offer may comprise all of the criteria specified in an initial request except for one criteria. For example, if a maximum price per unique identifier and a quantity of unique identifiers are specified in a request and the unique identifiers are unavailable, then an alternative offer for the quantity of unique identifiers at an increased maximum price per unique identifier may be offered. In an embodiment, if a maximum price per unique identifier and a quantity of unique identifiers are specified in a request and the unique identifiers are unavailable, then an alternative offer for a portion of the quantity of unique identifiers requested may be offered at the maximum price specified in the request. In other embodiments, an alternative offer may comprise one or more of the criteria specified in a request or in a default value.

In embodiments where a request or default value specifies that at least two unique identifiers should be contiguous and the unique identifiers are not available, an alternative offer may include a portion of the unique identifiers that are contiguous. For example, in an embodiment, a request provides that five telephone numbers are wanted and that the telephone numbers need to end with contiguous digits. In this embodiment, five telephone numbers meeting the criteria specified in the request may be unavailable. However, three telephone numbers that end with contiguous digits may be available and, in addition, two other telephone numbers may be available that are contiguous. In an embodiment, an alternative offer may be provided for the three telephone numbers that end with contiguous digits. In another embodiment, an alternative offer may be provided for the two telephone numbers that end with contiguous digits. In yet another embodiment, an alternative embodiment may be provided for both the three telephone numbers that end with contiguous digits and the two telephone numbers that end with contiguous digits. Likewise, where a request or default value provides that a portion of at least one unique identifier should have a certain value and a unique identifier is not available, an alternative offer may include an available unique identifier that has a portion of the unique identifier that is similar to the requested portion.

In an embodiment where a request or default value specifies that a requestor wishes to purchase one or more unique identifiers that are not available, an alternative offer may be provided. For example, in an embodiment, an alternative offer is provided with similar criteria that was initially requested but is available. In another embodiment, an alternative offer may be provided that offers the requested unique identifiers on one or more lease terms as opposed to the initial purchasing request. Similarly, in an embodiment where a requestor wishes to lease one or more unique identifiers that are not available, an alternative offer to purchase a unique identifier with similar characteristics may be offered.

In embodiments, a garbage traffic threshold may be specified in a request or by a default value and a unique identifier meeting the garbage traffic threshold may not be available. In such an embodiment, an alternative offer may be provided for one or more unique identifiers that are available but have a different garbage traffic threshold. Numerous additional embodiments are disclosed here or will be apparent to one of ordinary skill in the art and, therefore, are within the scope of the present disclosure.

Referring back to FIG. 4, after a determination is made as to whether unique identifiers are available 450 or whether additional offers are available 460 or if one or more alternative offers are presented 460, or some combination thereof, the method 400 proceeds to block 470. In block 470 a spot price is determined.

For example, if a request includes a maximum price per unique identifier, then the spot price may necessarily be the same or lower than the maximum price per unique identifier specified in the request. Likewise, if a request includes a total maximum price, then the spot price may be the same or lower than the total maximum price specified in the request. For example, in the embodiment discussed above regarding the request to lease ten IPv4 addresses for one week, it was determined that only seven of the ten requested IPv4 addresses are available and an additional offer for the seven IPv4 addresses were presented to the requestor. In this embodiment, the requestor may want to lease the seven available IPv4 addresses and, thus, a spot price is determined 470. In this embodiment, the spot price is based on the length of time for the lease (one week) and the type of unique identifier (IPv4).

A spot price may be determined based at least in part on any number of criteria. In an embodiment, a spot price is based at least in part on the received request. For example, a spot price may be determined based on one or more of the following criteria received in a request or determined by a default value, including but not limited to: quantity of unique identifiers, type of unique identifiers, whether a portion of at least two unique identifiers should be contiguous, whether a portion of at least one unique identifier should have a certain value, whether a request is to lease or purchase a unique identifier, a time frame, whether or not a request should auto-renew, or a garbage traffic threshold. In embodiment, a spot price may be based at least in part on one or more internal or external market factors.

For example, in an embodiment, a spot price per unique identifier may decrease as the quantity of unique identifiers requested increase. In another embodiment, a spot price per unique identifier may increase as the quantity of unique identifiers increase. For example, if a request provides that twenty-four contiguous IPv4 addresses are needed the spot price per IPv4 address for twenty-four IPv4 addresses that are contiguous may be higher than a single IPv4 address. In another embodiment, a spot price for a request specifying a higher garbage traffic threshold may be lower than a spot price for a request specifying a lower garbage traffic threshold. For example, a request specifying that an IPv4 address that has not previously been used in the last thirty days is needed may have a lower spot price than a request specifying that an IPv4 address that has not previously been used in the last year is needed.

In embodiments, a spot price may be based at least in part on the number of available unique identifiers meeting criteria specified in a request or an alternative offer, or both. For example, if a request specifies that five unique identifiers are needed and it is determined that one thousand unique identifiers satisfying the criteria in the request are available, the spot price may be lower for this request than if a request specifies that five unique identifiers are needed and it is determined that twenty unique identifiers satisfying the criteria in the request are available. In another embodiment, a spot price may be based at least in part on the total number of unique identifiers that are currently being used and the maximum number of unique identifiers.

In other embodiments, a spot price may be based at least in part on historical information for other transactions. For example, if an IPv4 address was previously leased for one month for $25, then this information may be used, at least in part, to determine a price for the same or a similar request.

Figure 6:
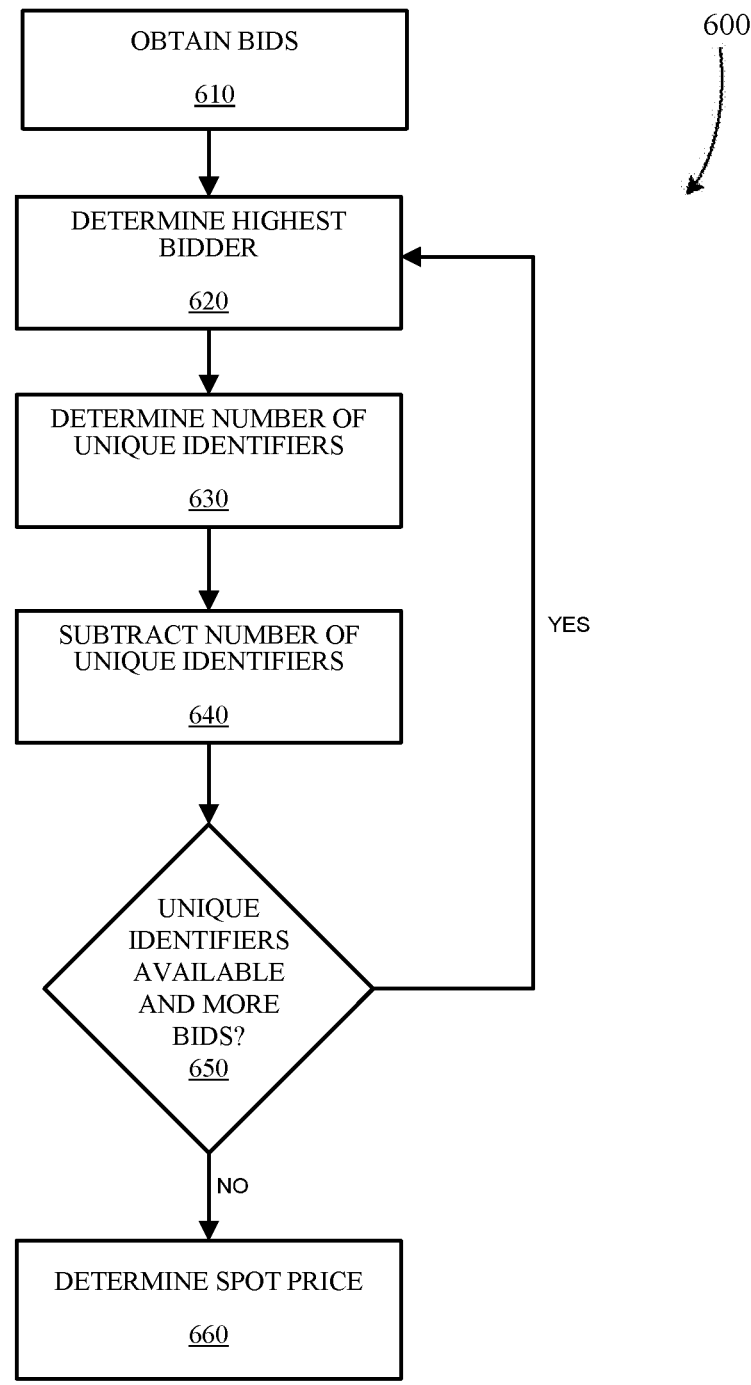
FIG. 6 is a flowchart illustrating a method of determining a spot price for unique identifiers according to an embodiment.

FIG. 6 presents a flowchart illustrating an example method 600 of determining a spot price for one or more unique identifiers that is based at least in part on historical information according to an embodiment. In FIG. 6, the method 600 begins by obtaining one or more bids for unique identifiers 610. As an example, three bids may be received to lease one or more IPv4 addresses for a month. After the bids are obtained 610, the highest bidder is determined 620. For example, a first bid may have a price for $5, a second bid may have a price of $8, and a third bid may have a price of $7 dollars. In this example, the second bid may be the determined highest bidder. After determining the highest bidder 620, the number of unique identifiers requested in the bid is determined 630. For example, in the embodiment discussed above, the first bid may be for two unique identifiers, the second bid may be for three unique identifiers and the third bid may be for four unique identifiers. In this embodiment, the determined number of unique identifiers may be three because the second bid was the highest bid and the bid requests three unique identifiers.

In embodiments, the highest bidder 620 may be determined based on any number of factors. In some embodiments discussed above, the highest bidder 620 is based on the highest bid price. A highest bidder 620 may be determined based on a number of unique identifiers. For example, in an embodiment, the highest bidder 620 may be the bidder requesting the largest number of IPv4 addresses. In another embodiment, the highest bidder 620 may be a bidder that best aligns with the available unique identifiers. For example, if a CIDR /24 block of IPv4 addresses is available, then a bidder requesting a CIDR /24 block may be considered a higher bidder than a bidder requesting a CIDR /25 block because the bidder requesting the CIDR /24 aligns better with the available IPv4 addresses. In embodiments, the highest bidder 620 may be based on any number of factors disclosed herein relating to requests or determining whether unique identifiers are available, or both.

After determining the number of unique identifiers requested by the highest bidder 630, the determined number of unique identifiers 640 are subtracted from a pool of unique identifiers. The pool of unique identifiers may or may not be related to a plurality of unique identifiers considered available as discussed with respect to method 400. For example, referring now to FIG. 4, in an embodiment the pool of unique identifiers is selected from one or more unique identifiers reserved for other's use 420. Thus, in this embodiment, the number of available unique identifiers considered to be available 430 in method 400 based on one or more internal constraints may not be affected by the method 600 used to determine a spot price. In other embodiments, one or more of the unique identifiers in the pool of unique identifiers may also be considered available in method 400 until the unique identifier is subtracted from the pool of unique identifiers. With respect to the embodiment discussed above, the pool of unique identifiers may initially contain eight unique identifiers. In this embodiment, the three unique identifiers from the second bid may be subtracted to from the pool of unique identifiers at block 640.

After subtracting the unique identifiers at block 640, in an embodiment, the method 600 proceeds to determine whether there are any more unique identifiers available in the pool of unique identifiers and whether there are additional bids remaining 650. If there are unique identifiers available and additional bids, then the method 600 returns to block 620; otherwise the method proceeds to block 660. The cycle between block 650 and block 620 can be repeated until either no bidders remain or no unique identifiers remain in the pool.

For example, in the embodiment discussed above, three unique identifiers may be subtracted from the initial pool of eight unique identifiers. Thus, five unique identifiers may remain in the pool of unique identifiers. In addition, in this embodiment, the first bid and the second bid still remain and so the method 600 returns to block 620. Then, it may be determined that the third bid is the next highest bid and that the third bid requests four unique identifiers. These four unique identifiers are then subtracted from the remaining pool of five unique identifiers.

In this embodiment, because at least one bid and unique identifier in the pool still exists, the method 600 returns to block 620. Here, it may be determined that the first bid is the highest bid ($5) remaining and that the first bid requests two unique identifiers. In block 640, however, only one unique identifier remains in the pool. Thus, the first bidder only receives one of the two requested unique identifiers. In this embodiment, the method 600 then proceeds to block 660.

In block 660, a spot price is determined. The spot price determined in block 660 may be based on any number of factors. In an embodiment, the spot price is equal to the maximum bid price of the last determined highest bidder in block 620. For example, in the embodiment, discussed above, the determined bid price 660 may be $5 per unique identifier. The determined spot price 660 may be a function of two or more bid prices. In an embodiment, the determined bid price is an average of the last highest determined bid price 660 and the next highest bid price that did not receive a unique identifier from the pool of unique identifiers. For example, in the embodiment discussed above, there may have been a fourth bid having a bid price of $4. In this embodiment, the spot price may be a function of the last determined bid price ($5) and the next highest bid price ($4). Thus, the spot price may be determined to be $4.50 per unique identifier. In other embodiments, the spot price may be based on any number of bid prices received in block 610. For example, in an embodiment, an average bid price of the bids obtained in block 610 may be used to determine a spot price. Additional embodiments or factors will be apparent to one of ordinary skill in the art.

Referring back to FIG. 4, after determining a spot price 470, the method proceeds to block 480. In block 480, one or more unique identifiers are managed. In an embodiment, access to the unique identifier is granted. For example, if a request is for a telephone number, then the requestor may be given access to the telephone number such that the requestor can make calls from the telephone number and receive calls to the telephone number.

Figure 7:
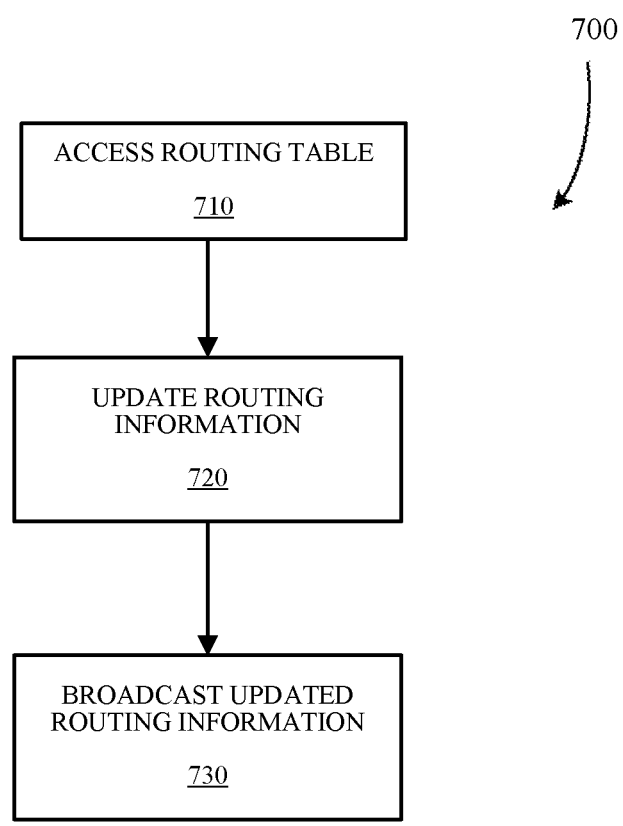
FIG. 7 is a flowchart illustrating a method of managing unique identifiers according to an embodiment.

In an embodiment, an address related to one or more unique identifiers may be updated on one or more electronic devices. For example, FIG. 7 illustrates a method 700 of managing unique identifiers according to an embodiment. The description of the method 700 shown in FIG. 7 will be made with respect to FIG. 1 which illustrate aspects of an example environment for implementing aspects in accordance with various embodiments. It should be noted, however, that the scope of the present disclosure is not limited to the explicit environment illustrated in FIG. 1 but in other environments, including variations of FIG. 1 not explicitly illustrated or described.

In FIG. 7, the method 700 begins by accessing a routing table at block 710. A routing table may be accessed in any number of ways. For example, in an embodiment, at least a portion of a routing table is obtained from a border gateway protocol (BGP) router or gateway such as gateway 200 shown in FIG. 2. A routing table or routing information related to a routing table may be accessed by querying one or more data stores. For example, referring to FIG. 1, data store 185 may contain routing information related to a routing table that can be accessed by the server 180 or the private gateway 180 among other devices. In one embodiment, routing information may be obtained from private gateway 140. In another embodiment, routing information may be obtained from the user gateway 120 such as through tunnel connection 155 or 165. In some embodiments, routing information may be obtained from a device associated with network 130. For example, routing information may be obtained from a BGP-supported router for the ISP 125 through network 130.

After accessing the routing table 710, routing information is updated 720. In an embodiment, updating routing information 720 can include updating an address associated with one or more unique identifiers. In another embodiment, updating routing information 720 may include simultaneously updating a block of addresses associated with unique identifiers. For example, in an embodiment, updating routing information 720 includes updating one or more routes for a block of IPv4 addresses. In some embodiments, each unique identifier in a block of unique identifiers may be updated. In other embodiments, only unique identifiers in a block of unique identifiers that are a value that needs to be changed are updated. In an embodiment, updating routing information 720 may include updating information stored in one or more data stores. For example, referring to FIG. 1, routing information may be updated in data store 185. In another embodiment, WHOIS or DNS information may be updated on server 180.

After updating the routing information 720, the updated routing information is broadcast 730. In an embodiment, broadcasting updating routing information includes pushing a preferred route for block of unique identifiers onto one or more routing tables. For example, a block of IPv4 addresses may be pushed onto one or more Internet routing tables maintained by an Internet routing device. Such Internet routing devices may be used to identify network destinations for other devices involved in routing network traffic. For example, in an embodiment, such an Internet routing device may be a BGP router that advertises BGP routes for IPv4 addresses to other BGP routers. In some embodiments, updated routing information may be broadcast or otherwise sent to routing tables maintained by one or more third parties. In an embodiment, at least a portion of a routing table broadcast to a BGP-enabled router or a gateway such as gateway 200 shown in FIG. 2. In one embodiment, referring to FIG. 1, routing information may be broadcast from private gateway 140. In another embodiment, routing information may be broadcast from user gateway 120 such as through tunnel connection 155 or 165, or through network 130. In some embodiments, routing information may be broadcast from a device associated with network 130. For example, routing information may be broadcast from a BGP-supported router for the ISP 125 through network 130.

Figure 8:
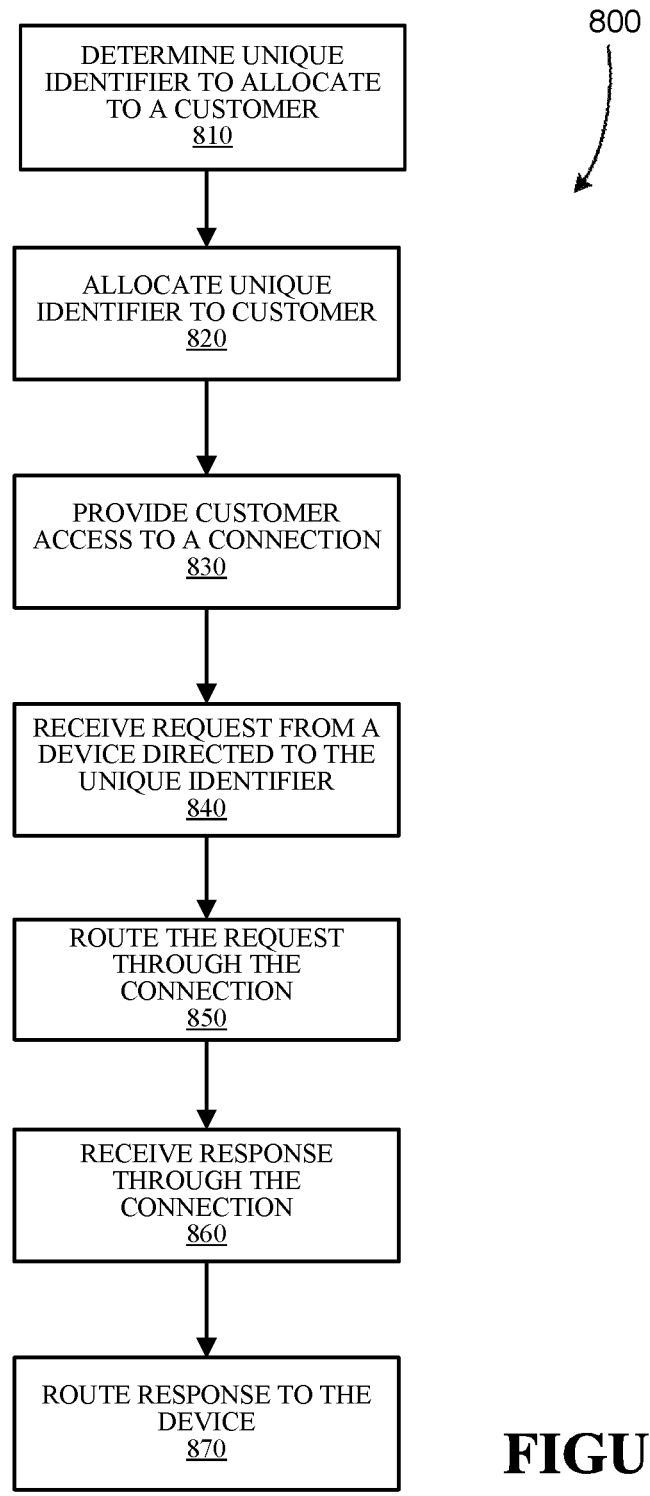
FIG. 8 is a flowchart illustrating a method of managing a spot market for unique identifiers according to an embodiment.

FIG. 8 illustrates a method 800 of managing unique identifiers according to an embodiment. The description of the method 800 shown in FIG. 8 will be made with respect to FIG. 1 which illustrate aspects of an example environment for implementing aspects in accordance with various embodiments. It should be noted, however, that the scope of the present disclosure is not limited to the explicit environment illustrated in FIG. 1 but in other environments, including variations of FIG. 1 not explicitly illustrated or described.

In FIG. 8, the method 800 begins by determining one or more unique identifiers to allocate to a customer 810. A customer may be a purchaser, bidder, leasee, or other entity to which one or more unique identifiers need to be allocated. One or more unique identifiers may be determined in any number of ways as disclosed herein. FIGS. 3 and 4 disclose various embodiments in which one or more unique identifiers can be determined for a customer. Other variations are within the scope of this disclosure. For example, referring to FIG. 1, a customer associated with user network 110 may submit a request for a CIDR /24 block of IPv4 addresses. In this embodiment, a determination may be made that the customer should receive an available CIDR /24 block of IPv4 addresses.

Once one or more unique identifiers have been determined 810, the method 800 proceeds to block 820. In block 820, one or more unique identifiers are allocated to the customer. Allocating one or more unique identifiers may be performed in any number of ways. In an embodiment, a data store is updated to reflect that the one or more unique identifiers have been allocated to the customer. For example, referring to FIG. 1, the data store 185 may be updated to reflect that the customer has access to the unique identifiers. In another embodiment, the unique identifiers are IP addresses and server 180 comprises a WHOIS server or a DNS server. In this embodiment, WHOIS records, DNS information, or other information may be updated in the data store 185 and/or on server 180 to reflect that the customer is associated with the IP addresses.

In one embodiment, a block of unique identifiers, such as a block of IPv4 addresses may be allocated to a customer. In this embodiment, another block of IPv4 addresses at least as large as and including the block of IPv4 addresses to be allocated to the customer may be determined. For example, a CIDR /24 block of IPv4 addresses may be requested by a customer and a CIDR /24 block of IPv4 addresses may be determined to be allocated to the customer. In this example, a CIDR /16 block of IPv4 addresses that includes the CIDR /24 block of IPv4 addresses may be determined. The CIDR /24 block of IPv4 addresses may be owned or managed by an organization. The organization may send a request to a regional internet registry (RIR), such as the American Registry for Internet Number (ARIN), for the CIDR /16 block of IPv4 addresses to be assigned to a WHOIS server associated with the organization. In an embodiment, such a request may allow the organization to update records related to the CIDR /16 block of IPv4 without further involving the RIR. For example, the organization may be able to update records for the CIDR /16 block of IPv4 internally such as through a WHOIS server and/or a data store. Thus, referring to FIG. 1, server 180 may comprise a WHOIS server that contains information related to the CIDR /16 block. Data store 185 may contain information related to the CIDR /16 block. In an embodiment, records related to the CIDR /16 block may be updated on the server 180 and/or data store 185. For example, records related to the CIDR /24 block of IPv4 addresses may be updated to reflect that the addresses have been allocated to the customer.

In one embodiment, a block of unique identifiers, such as a block of IPv4 addresses, that is at least as large as a block of unique identifiers to be allocated to a customer may have previously been delegated to a WHOIS server of an organization associated with the blocks of IPv4 addresses. In this embodiment, the organization may be able to update records related to the blocks of IPv4 addresses without sending a request to an RIR. For example, a CIDR /24 block of IPv4 addresses may need to be allocated to a customer and a CIDR /16 block of IPv4 addresses that includes the CIDR /24 block of IPv4 addresses may already be delegated to a WHOIS server of the organization. In this embodiment, the organization can update records for the CIDR /16 block without sending a request to the RIR. For example, referring to FIG. 1, server 180 may comprise a WHOIS server to which the CIDR /16 block of IPv4 addresses have been delegated. In this embodiment, records stored on the WHOIS server 180 and/or in the data store 185 may be updated to reflect that the customer has been allocated the CIDR /24 block of IP addresses.

In an embodiment, allocating one or more unique identifiers to a customer 820, can include granting the customer permission to use the one or more unique identifiers. For example, in an embodiment, a data store may contain various permissions that customers have been granted for unique identifiers. For example, referring to FIG. 1, data store 185 may contain the unique identifiers for which a customer has been granted permission. In this embodiment, a customer may be able to send a request to server 180 and in response may receive a list of unique identifiers that the customer has permission to use. In another embodiment, the customer may be granted a document, paper or digital certificate, or other notification that provides proof or otherwise indicates that the customer has been granted permission to use one or more unique identifiers.

In embodiments, the organization or the customer, or both, may contact a third-party that announces information related to the one or more unique identifiers allocated to a customer. For example, in one embodiment, a customer may be allocated a CIDR /16 block of IPv4 addresses. In this embodiment, the organization allocating the block to the customer or the customer may contact an ISP associated with the customer to announce information related to the block of addresses. The ISP may be requested by the organization or the customer to announce the CIDR /16 block of IPv4 addresses using an ASN associated with the ISP. For example, the ISP may announce the CIDR /16 block of IPv4 addresses allocated to the customer by the organization from a BGP-enabled router using an ASN associated with the ISP. In embodiments, the ISP may be requested to stop announcing one or more unique identifiers when an organization determines that one or more unique identifiers should be deallocated from the customer. For example, in the embodiment discussed above, the organization may determine that a CIDR /8 block of IPv4 addressees from the CIDR /16 block of IPv4 addresses should be deallocated from the customer. In this embodiment, the organization or the customer may contact the ISP and request that the ISP stop announcing the CIDR /8 block of IPv4 addresses that the organization determined should be deallocated from the customer.

Once one or more unique identifiers have been allocated to the customer 820, in embodiments, the method 800 proceeds to block 830. In block 830, access to at least one connection may be provided to the customer. In one embodiment, the at least one connection may be a VPN connection. For example, referring to FIG. 1, access may be provided to the customer for a VPN connection that comprises two tunnel connections 150, 160. Providing access to at least one connection may include providing the customer with information, such as a username and password, needed to complete a connection. In an embodiment, data store 185 may be updated to provide the customer access to one or more connections. In one embodiment, providing access to at least one connection can include configuring private gateway 140 to accept a connection from user gateway 120. In another embodiment, providing access to at least one connection includes providing information needed for the customer to configure user gateway 120 so that tunnel connection 155 and/or tunnel connection 165 can be established. In embodiments, when the organization determines that one or more unique identifiers should be deallocated from the customer access to one or more connections may be revoked, terminated, or otherwise disconnected. For example, in an embodiment, tunnel connection 155 and tunnel connection 165 may be disconnected and private gateway 140 may be configured so that user gateway 120 cannot establish a connection to the private gateway 120 at least for the deallocated unique identifiers. In another embodiment, access to a connection may be revoked by updating data store 185 to reflect that the customer no longer has access to a connection related to the deallocated unique identifiers.

In embodiments, once access to at least one connection has been provided to the customer 830, the method 800 proceeds to block 840. In block 840, a request can be received from a device that is directed to a unique identifier allocated to the customer. For example, referring to FIG. 1, client device 175 may send a request, such as a hypertext transfer protocol (HTTP) request, to an IP address allocated to a customer. In this embodiment, server 180 may receive the request through network 130.

Once a request has been received 840, the method 800 proceeds to block 850. In block 850, the request can be routed through the connection. For example, in the embodiment discussed above, the server 180 may receive the request. In one embodiment, the server 180 may determine that the request needs to be routed through a tunnel of a VPN connection such as tunnel connection 155 or tunnel connection 165. In another embodiment, the server 180 may query data store 185 to determine that the request needs to be routed through tunnel connection 155 or tunnel connection 165. In embodiments, the server 180 sends the request to the private gateway 140 which sends the request to the user gateway 120.

Once the request is routed through the connection 850, the method 800 proceeds to block 860. In block 860, a response may be received through the connection. For example, referring to FIG. 1, a device, such as another server or another desktop, in communication with user network 110 may determine that a response needs to be sent for the request. In this embodiment, the device may send the response to user gateway 120 which sends the response to private gateway 140. Private gateway 140, in turn, may send the response to server 180.

Once a response is received through the connection 860, the method 800 proceeds to block 870. In block 870, the response is routed to the device initially making the request. For example, if client device 175 initially sent an HTTP request to an IP address allocated to a customer by an organization, then server 180 may send the response received from the user network 110 to client device 175.

Referring back to FIG. 4, in various embodiments, one or more unique identifiers may be managed by charging the requestor the determined spot price for a number of the unique identifiers. In some embodiments, one or more unique identifiers may be managed by monitoring the current spot price for a request or an offer. For example, a request may specify that two IPv4 addresses are wanted each week and that the price of each IPv4 address is below a maximum price. In this embodiment, the request may be monitored and each week that the spot price for the request is below the maximum price, the requestor may be given access to the IPv4 address. Likewise, each week that the spot price for the request is at or above the maximum price, the requestor may no longer be given access to the IPv4 address. In addition, the IPv4 address may be determined to be available for another requestor to lease for a given period of time.

In embodiments, managing one or more unique identifiers may be performed automatically. For example, in the embodiment discussed above, access may be granted or removed at various times to one or more unique identifiers automatically. In an embodiment, a request may automatically be renewed at the current spot market price. In another embodiment, a request may automatically be renewed based at least in part on information contained in a request or based at least in part on one or more default values.

Figure 9:
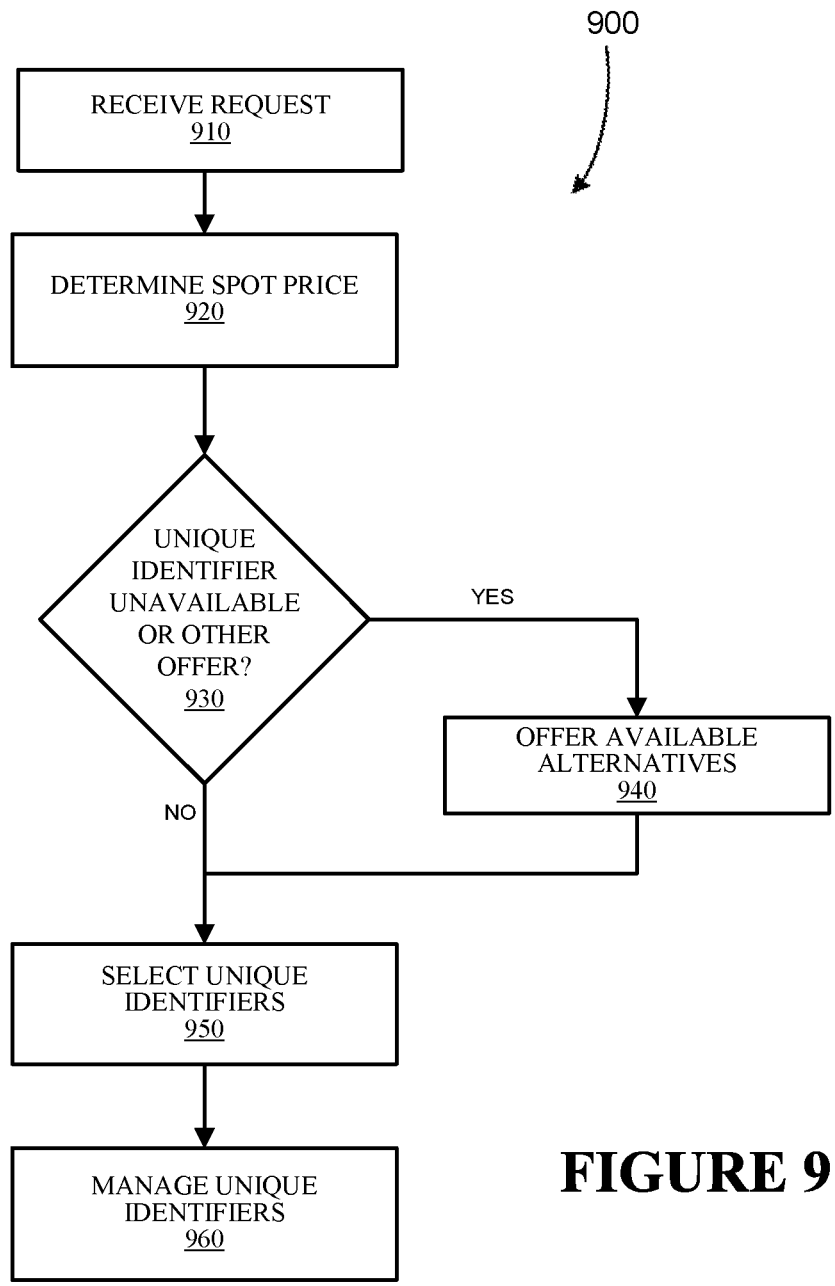
FIG. 9 is a flowchart illustrating a method of managing a spot market for unique identifiers according to an embodiment.

While the steps of method 400 have been shown and described in a particular order, other embodiments may comprise the same or additional steps or may perform the steps shown in FIG. 4 in a different order or in parallel. For example, FIG. 9 is a flowchart directed to a method of managing a spot market for unique identifiers according to an embodiment. In the embodiment shown in FIG. 9, if a received request 910 contains sufficient information to determine a spot price 920, then the method 900 proceeds to block 930. However, in this embodiment, requests 910 that do not contain sufficient information to determine a spot price 920 may not be completely processed. For example, in an embodiment, if a request 910 does not contain sufficient information to determine a spot price 920, then a response may be sent to a user associated with the request indicating that the request is deficient. Furthermore, as shown in the method 900 in FIG. 9, a spot price 920 is determined and then a determination is made as to whether one or more unique identifiers are available 930 that meet the criteria specified in the request.

Figure 10:
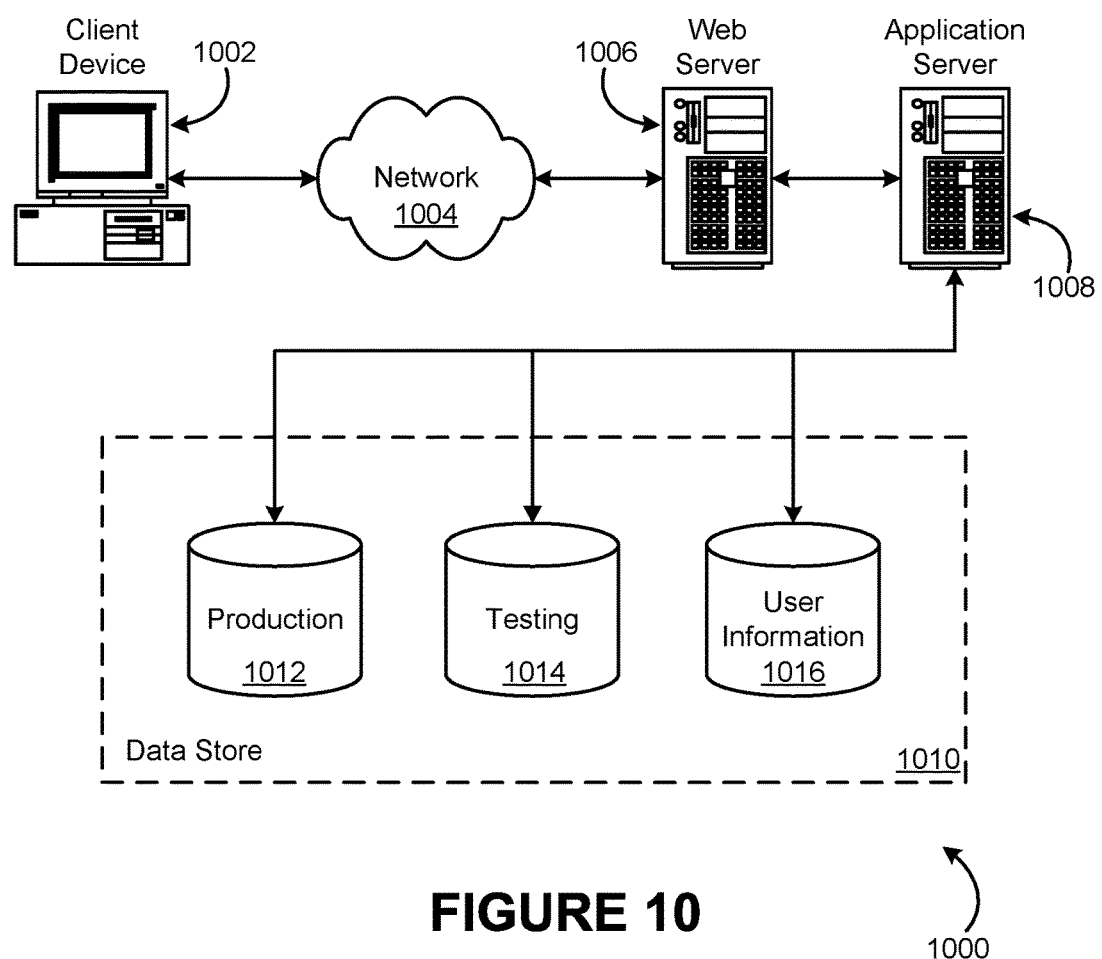
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in an embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computer system, a first traffic threshold that indicates a first amount of traffic that an internet protocol (IP) address receives when not allocated to a customer;
   determining, by the computer system and in response to a customer transaction for IP addresses, to allocate the IP address to the customer based at least in part on the first traffic threshold and a second traffic threshold identifying a second amount of traffic, the second traffic threshold received from the customer;
   allocating, by the computer system, the IP address to the customer;
   providing, by the computer system, to the customer access to a connection configured to privately share information between a first network associated with the IP address and a second network associated with the customer, the first network being in a location that is geographically remote from the second network;
   receiving, by the computer system, a request directed to the IP address from a third network; and
   routing, by the computer system, the request to the second network through the connection.

2. The computer-implemented method of claim 1, further comprising:
   receiving, by the computer system, a response to the request from the second network through the connection; and
   routing, by the computer system, the response to the third network.

3. The computer-implemented method of claim 1, wherein determining the IP address to allocate to the customer is based at least in part on a bid request from the customer.

4. The computer-implemented method of claim 1, wherein the IP address is an IPv4 address or an IPv6 address.

5. The computer-implemented method of claim 1, wherein the connection comprises a virtual private network (VPN) connection.

6. The computer-implemented method of claim 1, further comprising:
   determining, by the computer system, to deallocate the IP address from the customer; and
   deallocating, by the computer system, the IP address from the customer by at least denying the customer access to the connection.

7. The computer-implemented method of claim 1, wherein allocating the IP address to the customer comprises sending Border Gateway Protocol updates to Internet routers, the updates causing the Internet routers to route traffic, via the connection, to at least the second network associated with the customer.

8. The computer-implemented method of claim 1, wherein the customer transaction for the IP addresses includes electronically encoded information that indicates at least a request for a number of IP addresses, whether the customer transaction is for a lease or purchase of the number of IP addresses, and an allocation period to lease or purchase the number of IP addresses.

9. A computer-implemented method, comprising:
   maintaining, by a computer system, a first traffic threshold that indicates a first amount of traffic that internet protocol (IP) addresses of a first block of IP addresses receives when not allocated to a customer;
   determining, by the computer system and in response to a customer transaction for the IP addresses, to allocate the first block of internet protocol (IP) addresses managed by an organization to the customer based at least in part on the first traffic threshold and a second traffic threshold identifying a second amount of traffic, the second traffic threshold received from the customer;
   updating, by the computer system, at least one record on a WHOIS server of the organization to allocate the first block of IP addresses to the customer;
   providing, by the computer system, the customer with permission to use the first block of IP addresses; and
   providing, by the computer system, to the customer access to a connection configured to privately share information between a first network associated with the first block of IP addresses and a second network associated with the customer, the first network being in a location that is geographically remote from the second network.

10. The computer-implemented method of claim 9, further comprising:
   determining, by the computer system, a second block of IP addresses comprising at least the first block of IP addresses; and
   sending, by the computer system, a request to a regional internet registry (RIR), the request indicating that the second block of IP addresses needs to be associated with a WHOIS server of an organization that manages the second block of IP addresses.

11. The computer-implemented method of claim 9, wherein the size of the first block of IP addresses is based at least in part on a bid request from the customer.

12. The computer-implemented method of claim 9, wherein the first block of IP addresses comprises a contiguous block of 256 IP addresses.

13. The computer-implemented method of claim 9, further comprising:
   sending, by the computer system, a request to an internet service provider (ISP) of the customer, the request indicating that the first block of IP addresses needs to be announced from an autonomous system number (ASN) for the ISP.

14. The computer-implemented method of claim 9, further comprising:
   determining, by the computer system, to deallocate the first block of IP addresses from the customer; and
   deallocating, by the computer system, the first block of IP addresses from the customer by at least sending a request to an internet service provider (ISP) of the customer announcing the first block of IP addresses, the request indicating that the ISP should no longer announce the first block of IP addresses.

15. A computer system for managing internet protocol (IP) addresses, comprising:
   one or more processors; and
   memory, including executable instructions that, when executed by the one or more processors, cause the computer system to at least:
      maintain a first traffic threshold that indicates a first amount of traffic that an IP address receives when not allocated to a customer;
      determine to allocate the IP address to the customer in response to a first request, from the customer, for IP addresses based at least in part on the first traffic threshold and a second traffic threshold identifying a second amount of traffic, the second traffic threshold received from the customer in the first request;
      allocate the IP address to the customer;
      provide to the customer access to a connection configured to privately share information between a first network associated with the IP address and a second network associated with the customer;
      receive a second request directed to the IP address from a third network; and
      route the second request to the second network through the connection.

16. The computer system of claim 15, wherein allocating the IP address to the customer comprises sending Border Gateway Protocol Updates to Internet routers, the updates causing the Internet routers to route traffic, via the connection, to at least the second network associated with the customer.

* * * * *